US010513099B2

(12) United States Patent
Araki et al.

(10) Patent No.: US 10,513,099 B2
(45) Date of Patent: Dec. 24, 2019

(54) STRUCTURED BODY HAVING HYDROPHOBIC SURFACE, AND METHOD FOR PRODUCING THE SAME

(71) Applicant: TOYO SEIKAN GROUP HOLDINGS, LTD., Tokyo (JP)

(72) Inventors: Kei Araki, Tokyo (JP); Yosuke Akutsu, Yokohama (JP); Shinya Iwamoto, Yokohama (JP)

(73) Assignee: TOYO SEIKAN GROUP HOLDINGS, LTD., Tokyo (JP)

( * ) Notice: Subject to any disclaimer, the term of this patent is extended or adjusted under 35 U.S.C. 154(b) by 115 days.

(21) Appl. No.: 15/561,555

(22) PCT Filed: Mar. 28, 2016

(86) PCT No.: PCT/JP2016/059965
§ 371 (c)(1),
(2) Date: Sep. 26, 2017

(87) PCT Pub. No.: WO2016/158875
PCT Pub. Date: Oct. 6, 2016

(65) Prior Publication Data
US 2018/0086037 A1    Mar. 29, 2018

(30) Foreign Application Priority Data

Mar. 27, 2015 (JP) ................................. 2015-067148
Oct. 16, 2015 (JP) ................................. 2015-204690
Feb. 19, 2016 (JP) ................................. 2016-029525

(51) Int. Cl.
B32B 27/32 (2006.01)
B29C 48/18 (2019.01)
(Continued)

(52) U.S. Cl.
CPC ............ *B32B 27/32* (2013.01); *B29C 48/154* (2019.02); *B29C 48/18* (2019.02); *B29C 48/21* (2019.02);
(Continued)

(58) Field of Classification Search
CPC ..... Y10T 428/1352; B32B 27/32; B32B 3/26; B32B 1/02; B32B 27/36; B32B 27/325;
(Continued)

(56) References Cited

U.S. PATENT DOCUMENTS 9,327,879 B2    5/2016   Sekiguchi et al.
2015/0017334 A1  1/2015   Sekiguchi et al.
2015/0314554 A1  11/2015  Fujiwara et al.

FOREIGN PATENT DOCUMENTS

JP       2009-073523 A    4/2009
JP       4348401 B1       10/2009
(Continued)

OTHER PUBLICATIONS

International Search Report for PCT/JP2016/059965, dated Jun. 21, 2016.
(Continued)

*Primary Examiner* — James C Yager
(74) *Attorney, Agent, or Firm* — Sughrue Mion, PLLC

(57) ABSTRACT

A structured body including: a formed body, the surface of which being formed of an underlying resin layer (1); and fine particles distributed on the underlying resin layer (1) on the surface of the formed body, wherein the structured body is characterized in that wax (3) is distributed on the surface of the underlying resin layer (1) together with fine particles (7), and the wax (3) is partly absorbed into the underlying resin layer (1).

14 Claims, 12 Drawing Sheets

(51) Int. Cl.

| | | |
|---|---|---|
| *C09D 7/61* | (2018.01) | |
| *C09D 7/40* | (2018.01) | |
| *B32B 5/16* | (2006.01) | |
| *B65D 1/02* | (2006.01) | |
| *C08J 7/04* | (2006.01) | |
| *C09D 123/06* | (2006.01) | |
| *B32B 27/18* | (2006.01) | |
| *B65D 23/08* | (2006.01) | |
| *B32B 5/18* | (2006.01) | |
| *B32B 7/12* | (2006.01) | |
| *B32B 15/082* | (2006.01) | |
| *B32B 15/085* | (2006.01) | |
| *B32B 15/09* | (2006.01) | |
| *B32B 27/06* | (2006.01) | |
| *B32B 27/08* | (2006.01) | |
| *B32B 27/10* | (2006.01) | |
| *B32B 27/14* | (2006.01) | |
| *B32B 27/30* | (2006.01) | |
| *B32B 27/36* | (2006.01) | |
| *B32B 1/02* | (2006.01) | |
| *B32B 3/26* | (2006.01) | |
| *B29C 48/154* | (2019.01) | |
| *B29C 48/21* | (2019.01) | |
| *B29L 9/00* | (2006.01) | |
| *B29C 48/00* | (2019.01) | |

(52) U.S. Cl.
CPC .......... *B32B 1/02* (2013.01); *B32B 3/26* (2013.01); *B32B 5/16* (2013.01); *B32B 5/18* (2013.01); *B32B 7/12* (2013.01); *B32B 15/082* (2013.01); *B32B 15/085* (2013.01); *B32B 15/09* (2013.01); *B32B 27/065* (2013.01); *B32B 27/08* (2013.01); *B32B 27/10* (2013.01); *B32B 27/14* (2013.01); *B32B 27/18* (2013.01); *B32B 27/306* (2013.01); *B32B 27/308* (2013.01); *B32B 27/325* (2013.01); *B32B 27/36* (2013.01); *B65D 1/0215* (2013.01); *B65D 23/0828* (2013.01); *C08J 7/047* (2013.01); *C09D 7/61* (2018.01); *C09D 7/70* (2018.01); *C09D 123/06* (2013.01); *B29C 48/022* (2019.02); *B29K 2995/0093* (2013.01); *B29L 2009/005* (2013.01); *B32B 2250/02* (2013.01); *B32B 2255/10* (2013.01); *B32B 2255/24* (2013.01); *B32B 2255/26* (2013.01); *B32B 2260/00* (2013.01); *B32B 2264/102* (2013.01); *B32B 2264/104* (2013.01); *B32B 2307/31* (2013.01); *B32B 2307/538* (2013.01); *B32B 2307/704* (2013.01); *B32B 2307/7244* (2013.01); *B32B 2307/73* (2013.01); *B32B 2439/02* (2013.01); *B32B 2439/60* (2013.01); *B32B 2439/70* (2013.01); *C08J 2323/06* (2013.01); *C08J 2491/08* (2013.01); *Y10T 428/1352* (2015.01)

(58) Field of Classification Search
CPC ..... B32B 27/308; B32B 27/306; B32B 27/14; B32B 27/10; B32B 27/08; B32B 27/065; B32B 15/09; B32B 15/085; B32B 7/12; B32B 5/18; B32B 5/16; B32B 2439/70; B32B 2439/02; B32B 2439/60; B32B 2307/7244; B32B 2307/704; B32B 2307/538; B32B 2307/31; B32B 2307/73; B32B 2264/104; B32B 2264/102; B32B 2260/00; B32B 2255/26; B32B 2255/24; B32B 2255/10; B32B 2250/02; B32B 27/18; B29C 48/21; B29C 48/18; B29C 48/154; B29C 48/022; B65D 23/0828; B65D 1/0215; C09D 7/70; C09D 7/61; C09D 123/06; C08J 7/047; C08J 2323/06; C08J 2491/08; B29L 2009/005; B29K 2995/0093

See application file for complete search history.

(56) References Cited

FOREIGN PATENT DOCUMENTS

| | | |
|---|---|---|
| JP | 2012-228787 A | 11/2012 |
| JP | 2013-071779 A | 4/2013 |
| JP | 2013-075715 A | 4/2013 |
| JP | 2013-103751 A | 5/2013 |
| JP | 2013-209126 A | 10/2013 |
| JP | 2014-051295 A | 3/2014 |
| JP | 5490574 B2 | 5/2014 |
| WO | 2014-087695 A1 | 6/2014 |

OTHER PUBLICATIONS

Communication dated Jul. 31, 2018 from the European Patent Office in counterpart application No. 16772756.9.

Fig. 16

STRUCTURED BODY HAVING HYDROPHOBIC SURFACE, AND METHOD FOR PRODUCING THE SAME

This application is a National Stage of International Application No. PCT/JP2016/059965 filed Mar. 28, 2016, claiming priority based on Japanese Patent Application No. 2015-067148 filed Mar. 27, 2015, Japanese Patent Application No. 2015-204690 filed Oct. 16, 2015 and Japanese Patent Application No. 2016-029525 filed Feb. 19, 2016, the contents of all of which are incorporated herein by reference in their entirety.

TECHNICAL FIELD

The present invention relates to a structured body having a hydrophobic surface, and more specifically, a structured body having a hydrophobic rugged surface formed with fine particles distributed on the surface. The present invention further relates to a method for producing the same.

BACKGROUND ART

Since plastics are formed easily and can be formed to have various shapes easily, they are used widely for various purposes. For example, they are used preferably as containers to contain various beverages, edible oils, seasoning liquids, gel-like viscous foods such as yoghurt, as well as liquid detergents and pastes.

A container to contain a liquid content or a gel-like content is often required to prevent effectively the content from adhering and remaining on the inner surface of the container (non-adhesiveness of the content), or to discharge the content speedily from the container (slip-down property of the content).

Known methods for improving the non-adhesiveness and the slip-down property (hereinafter, these properties may be called slipperiness) include distributing hydrophobic fine particles on the surface to be in contact with the content, and covering the surface with a solid wax (see Patent Documents 1-3, for example).

That is, these known methods are to provide excellent slipperiness with respect to a moisture-containing content by applying hydrophobic fine particles or solid wax on the surface to be in contact with the content. In particular, when the hydrophobic fine particles are distributed on the surface, irregularities are provided on the surface to remarkably improve the slipperiness to the content. That is, when the content moves on the surface of the irregularities, the content moves in contact with air present among the irregularities. Since air has the highest water repellency, water repellency exhibited by the hydrophobic fine particles and the water repellency caused by the irregularities are combined with each other to considerably increase the slipperiness with respect to the content.

PRIOR ART DOCUMENTS

Patent Documents

Patent Document 1: JP-A-2012-228787
Patent Document 2: JP 5490574
Patent Document 3: JP 4348401

SUMMARY OF THE INVENTION

Problems to be Solved by the Invention

Meanwhile, any of the conventionally known methods using hydrophobic fine particles or solid wax uses a coating solution prepared by dissolving the components in an organic solvent, thereby coating the solution on a surface and drying. As a result, the method may cause a problem that removal of the solvent can impose a great load on the environment.

Therefore, an object of the present invention is to provide a structured body having a hydrophobic surface formed by using fine particles and wax but not using an organic solvent.

Another object of the present invention is to provide a method for producing the structured body on which the hydrophobic surface is formed.

Means for Solving the Problems

The present invention provides a structured body including a formed body having a surface formed of a resin layer and fine particles distributed on the resin layer on the surface of the formed body.

On the surface of the resin layer, wax is distributed together with the fine particles, and the wax is partly absorbed into the resin layer.

In the present specification, the formed body indicates a body having a surface formed of a resin layer (underlying resin layer), and the structured body indicates a body having the formed body provided with fine particles and wax distributed on a resin layer on the surface of the formed body, and further the wax is absorbed into the surface resin layer.

In the structured body of the present invention, the following embodiments are employed preferably:

(1) the fine particles are hydrophobic fine particles;
(2) a metaball steric layer of the wax spreading like continuous metaballs is formed on the resin layer, and the fine particles are distributed inside the metaball steric layer;
(3) the metaball steric layer has a structure of linked balls having a diameter in a range of 20 to 200 nm in an observation with a scanning electron microscope;
(4) the fine particles have an average primary particle diameter in a range of 4 nm to 1 μm;
(5) the wax has a melting point in a range of 40° C. to 110° C.;
(6) the resin layer is formed of a resin having an SP value different by not more than 1.5 $(MPa)^{1/2}$ from an SP value of the wax;
(7) the resin forming the resin layer is an acyclic olefinic resin and the wax is at least one selected from the group consisting of paraffin wax, microcrystalline wax, and polyethylene wax;
(8) the formed body has a form of a container, and the fine particles and the wax are distributed on the inner surface of the container to be in contact with a content contained in the container;
(9) the container is a bottle made of an olefinic resin; and
(10) the formed body has a form of a lid provided at a mouth of a container by heat-sealing, and the fine particles and the wax are distributed on the surface to be in contact with a content contained in the container.

Further, the present invention provides a method for producing a structured body having a hydrophobic surface, and the method includes:

a step of preparing a solventless coating composition containing fine particles and melted wax, and a formed body having a surface formed of a layer of a wax-absorbent resin;
a coating step of coating the solventless coating composition on the surface of the formed body;
a wax-absorbing step of heating the surface of the formed body at a temperature not lower than the melting point of the wax to maintain the wax in a melted state so as to allow the wax to be absorbed into the wax-absorbent resin layer on the surface; and a cooling step of cooling the formed body surface after the wax-absorbing step so as to solidify the melted wax.

In the producing method, it is preferable that:
(1) the wax-absorbent resin has an SP value different by not more than 1.5 $(MPa)^{1/2}$ from an SP value of the wax; and
(2) when the melting point of the wax-absorbent resin is X° C., heating for maintaining the wax in the melted state during the wax-absorbing step is conducted for a time period of 5 seconds to 10 minutes at a temperature Y that satisfies a conditional formula:

$$X-5 \geq Y \geq X-50.$$

The present invention further provides a method for producing a structured body having a hydrophobic surface. The method includes production of a formed body having a surface formed of a layer of a wax-absorbent resin by co-extrusion of the wax-absorbent resin, wherein a solventless composition containing fine particles and a melted wax is co-extruded at a position facing a surface side and adjacent to the layer of the wax-absorbent resin.

Effects of the Invention

In the structured body of the present invention, wax is absorbed into the resin layer (which is hereinafter called a underlying layer) on the surface of the formed body, and fine particles are distributed on the underlying layer. Due to the fine particles, a hydrophobic rugged surface is formed on the structured body surface, thereby improving remarkably slipperiness to moisture-containing substances.

The hydrophobic rugged surface on the wax-absorbent underlying layer can be formed without using an organic solvent, and this is the biggest advantage of the present invention.

Specifically, a formed body having a surface formed of a wax-absorbent resin is formed, on which a coating composition of melted wax containing fine particles distributed therein is coated, and which is heated to or higher than the melting point of the wax. In this manner, the wax is absorbed into the underlying layer on the surface of the formed body, so that the fine particles are distributed adhering to the surface.

According to the method, it is possible to adjust the degree of irregularities of the hydrophobic rugged surface formed on the surface of the underlying resin layer, by adjusting the heating time, heating temperature or the like. For example, when the heating time is extended or the heating temperature is raised, the absorption amount of the wax from the coating composition into the wax-absorbent underlying layer is increased.

That is, when most of the wax in the coating composition is absorbed into the underlying layer, a thin wax layer is formed on the surface of the underlying layer from which fine particles protrude to form a hydrophobic rugged surface. The fine particles protruding from the thin wax layer may be exposed, or in some cases, they protrude with the wax layer formed on the particle surface. The degree of irregularities of the hydrophobic rugged surface relies greatly on the particle diameter of the fine particles.

By reducing the particle diameter of the hydrophobic fine particles in use and by controlling the amount of the wax absorbed into the underlying layer, a metaball steric layer of wax spreading like continuous metaballs can be formed on the underlying layer. Fine particles are distributed inside the metaball steric layer, and the metaball steric layer forms the hydrophobic rugged surface. On the hydrophobic rugged surface, a plurality of fine particles are distributed inside of each of the metaballs linked to each other, thereby exhibiting the highest slipperiness in the present invention.

Further in the present invention, it is possible to utilize co-extrusion for forming a hydrophobic rugged surface having fine particles distributed on the surface of the underlying layer into which the wax is absorbed.

That is, during forming a formed body having the resin layer thereon by extruding a melt of wax-absorbent resin, a solventless composition containing fine particles distributed in wax melt is co-extruded onto a position facing the surface side and adjacent to the resin layer. In this manner, the wax as a dispersion medium for the fine particles is absorbed into the adjacent resin layer (underlying layer), whereby a hydrophobic rugged surface having fine particles distributed in its surface can be formed.

This method also can be used to form a hydrophobic rugged surface without using an organic solvent. The hydrophobic rugged surface is formed similarly with a metaball steric layer containing fine particles distributed inside thereof.

The hydrophobic rugged surface of the structured body of the present invention having fine particles can be formed without using an organic solvent. This can completely eliminate labors and efforts to capture the organic solvent or the like that volatilizes during heating, thereby improving remarkably the production efficiency and reducing the production cost, while avoiding adverse effects on the environment, thereby to provide a remarkable advantage from the viewpoint of industrial implementation.

The hydrophobicity of the surface can be enhanced further by using, as the fine particles, the hydrophobic fine particles imparted with hydrophobicity.

BRIEF DESCRIPTION OF THE DRAWINGS

[FIG. 16]: SEM photographs showing rugged surface structures prepared in the respective experiments.

MODE FOR CARRYING OUT THE INVENTION

<Surface Structure of Structured Body>

Figure 1:
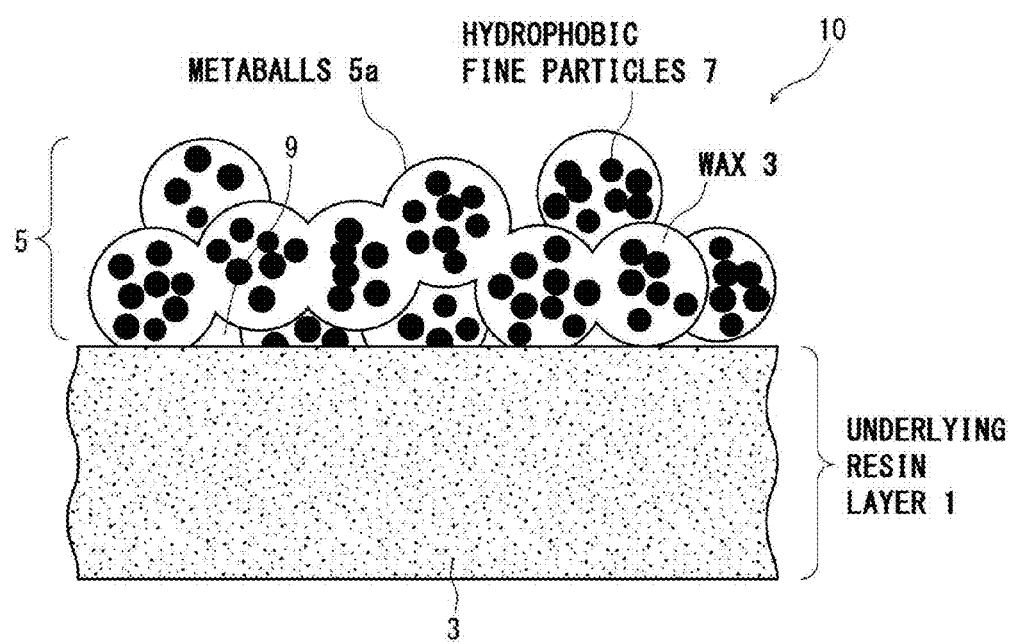
[FIG. 1]: a schematic cross-sectional view showing a most preferred hydrophobic rugged surface formed on a surface of a structured body of the present invention.

FIG. 1 shows the most preferred surface structure of the structured body of the present invention. The structured body, which is indicated as a whole with numeral 10, has a underlying resin layer 1 (underlying layer) of a wax-absorbent resin formed on a surface of a formed body having a predetermined shape, and a wax 3 is absorbed into this underlying layer 1. Further, a metaball steric layer 5 is formed on the underlying layer 1 that absorbs the wax 3.

This metaball steric layer 5 is composed of spherical metaballs 5a of the wax 3 linked three-dimensionally. As illustrated in FIG. 1, a plurality of fine particles 7 are distributed inside each of the metaballs 5a. This metaball steric layer 5 thus forms the hydrophobic rugged surface.

The diameter of the metaballs 5a (equivalent circle diameter) in the metaball steric layer 5 is 20 to 200 nm, particularly preferably 50 to 150 nm in a measurement with a scanning electron microscope. Further, since the steric layer 5 is formed due to linkage of the metaballs 5a, voids 9 are present inside the layer. The metaball steric layer 5 imparts a rugged surface with great irregularities having voids inside thereof. Furthermore, since the layer is formed of the hydrophobic wax 3, it exhibits high hydrophobicity and also extremely high slipperiness with respect to moisture-containing substances and hydrophilic substances.

The metaball steric layer 5 is formed by using a solventless coating composition containing the fine particles 7 and the melted wax 3 (i.e., containing no solvent). The composition is coated on the underlying layer 1, the surface of the underlying layer 1 is heated to maintain the melted state of the wax 3, thereby allowing the wax 3 to be absorbed partly into the underlying layer 1 and then cooled.

In other words, the metaball steric layer 5 forming the hydrophobic rugged surface has an extremely peculiar structure, which is formed by allowing the wax 3 to be absorbed into the underlying resin layer 1 in a state where the fine particles 7 coexist with the melted wax 3. The wax 3, which is melted while containing the fine particles 7 inside, is absorbed gradually into the underlying layer 1. As a result, the wax 3 is absorbed preferentially at a position distanced from the fine particles 7 while the wax 3 in the vicinity of the fine particles 7 remains together with the fine particles 7 on the underlying layer 1.

Since the wax 3 melted in this manner is cooled and solidified, a linked structure of the metaballs 5a of the wax 3 which are spheres or substantial spheres having smooth surfaces, is formed. Each of the metaballs 5a has a plurality of fine particles 7 distributed therein, and voids 9 are formed among the metaballs 5a. The metaball steric layer 5 thus formed on the underlying layer 1 into which the wax 3 is absorbed has a structure including the wax 3 and the voids 9. The shape of the metaballs resembles a space-filling model (S) used widely to indicate spatially a chemical structure of a substance, for example.

Formation of the metaball steric layer 5 can be confirmed with an atomic force microscope or a scanning electron microscope as stated in Examples described below.

Figure 2:
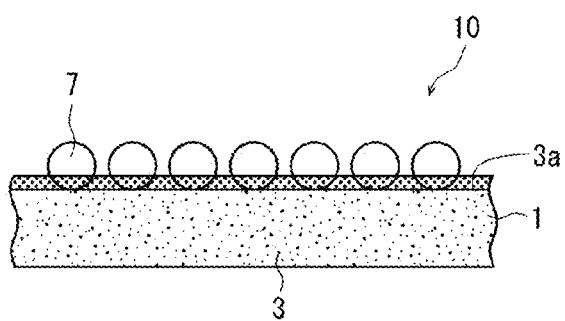
[FIG. 2]: a schematic cross-sectional view showing another example of a hydrophobic rugged surface formed on a surface of a structured body of the present invention.

Further, as understandable from the above description, when the coating of the solventless coating composition containing the fine particles 7 and the melted wax 3 is heated further after formation of the metaball steric layer 5, the melted wax 3 around the fine particles 7 may fall downward the surface of the underlying layer 1. As a result, as shown in FIG. 2, a thin layer 3a of the wax 3 is formed on the underlying layer 1 absorbing the wax 3, and the fine particles 7 are distributed protruding from this thin layer 3a. At the parts where the fine particles 7 protrude from this thin layer 3a, the surfaces of the fine particles 7 are exposed or covered with a trace amount of wax 3.

A hydrophobic rugged surface is formed similarly on the surface structure. This hydrophobic rugged surface is inferior to the aforementioned metaball steric layer 5 in slipperiness due to the gentle irregularities and absence of voids 9 inside thereof, but it can hold stably the fine particles 7 and exhibit stably the slipperiness for a long period of time. Usually, the thin layer 3a is preferred to have a thickness in a range of about 2 nm to about 1 μm from the viewpoint of keeping slipperiness and holding reliably the fine particles 7.

When heat is applied continuously from the state as shown in FIG. 2 to hold the wax 3 in a melted state, the wax 3 forming the thin layer 3 is also absorbed into the underlying resin layer 1, and consequently only the fine particles remain on the surface of the underlying layer 1. Even in this state, a hydrophobic rugged surface is formed with the fine particles 7 distributed on the surface. Moreover, the surface of the underlying layer 1 containing the hydrophobic wax 3 exhibits slipperiness of a certain level. However, since the fine particles 7 may drop out more easily in comparison with the embodiment shown in FIGS. 1 and 2, this example is not suitable for exhibiting slipperiness for a long period of time.

Figure 3:
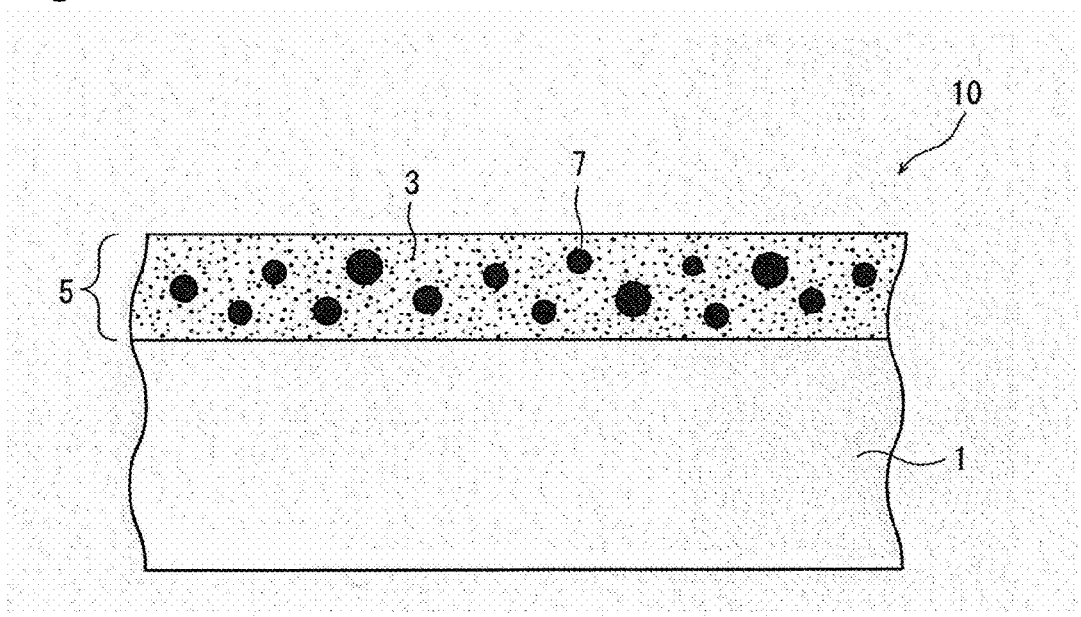
[FIG. 3]: a schematic cross-sectional view showing a hydrophobic surface of a form different from the hydrophobic rugged surface formed on a surface of a structured body of the present invention.

When a coating composition containing an organic solvent is used, the wax 3 may be precipitated at the same time of vaporization of the organic solvent, and thus, the wax 3 is not absorbed into the underlying layer 1. As a result, as shown in FIG. 3, simply a surface layer 5 containing the fine particles 7 distributed in the wax 3 is formed on the underlying layer 1. There is no void in this surface layer 5, and a rugged surface is not formed. Consequently, the hydrophobicity is extremely degraded in comparison to a structured body 10 of the present invention having the surface structure as shown in FIGS. 1 and 2.

Wax-Absorbent Underlying Resin Layer (Underlying Layer) 1;

In the present invention, the underlying layer 1 is capable of absorbing wax (hydrocarbon wax, ester wax and the like).

In determination of wax absorbency of the underlying layer 1, the wax to be used is melted and coated on the underlying layer 1 to check the absorbency (volume change). Based on this determination, the resin to be used for the underlying layer can be selected depending on the type of wax in use. Alternatively, the type of wax can be selected depending on the type of resin used for the underlying layer 1.

It is usually preferable to form the underlying layer 1 by using a thermoplastic resin that has a high hydrophobicity, for example, its contact angle to water measured at 23° C. is not less than 70°, preferably not less than 85°, including no polar group in the molecular chain, and having a comparatively loose structure with no crosslinking structure, and the specific examples include olefinic resins and polyester resins.

Examples of the olefinic resin include random or block copolymers of α-olefins such as low-density polyethylene, high-density polyethylene, polypropylene, poly1-butene, poly4-methyl-1-pentene or ethylene, propylene, 1-butene, 4-methyl-1-pentene, (meth)acrylic acid, (meth)acrylic acid ester, and vinyl acetate; and a cyclic olefin copolymer. Examples of the polyester resin include polyethylene terephthalate, polybutylene terephthalate, polyethylene naphthalate, and polylactic acid. These may be blended in use as required.

The resin to form the underlying layer 1 has a molecular weight at least for enabling formation of a film. However, a resin having an excessively high molecular weight (for example, ultra-high molecular weight polyethylene) may exhibit substantially no wax absorbency. Therefore usually, a resin having a melt flow rate (MFR) of a normal extrusion grade is used preferably.

Further in the present invention, among the aforementioned various thermoplastic resins, a resin having a SP value different from that of the wax 3 by not more than 1.5 $(MPa)^{1/2}$ is used most preferably as the resin for forming the underlying layer 1.

The SP value is an index called solubility parameter δ calculated by the calculation method proposed by Small, and it is a value calculated from the molar traction force constant and molecular volume with respect to atoms or atomic groups constituting the molecules, the bonded form and the like (P. A. J. Small: J. Appl Chem., 3, 71 (1953)). The SP value is widely used as a parameter for evaluating the compatibility between substances. A smaller difference in the value indicates that the substances have a higher affinity with each other and the compatibility between them is higher.

Namely, when a resin having an SP value in a range close to that of the wax 3 is used, the resin has a remarkably high affinity with the wax 3, and thus, the wax 3 can be absorbed easily into the underlying layer 1, which is extremely preferable in formation of the aforementioned metaball steric layer 5.

The SP values of the paraffin wax and representative thermoplastic resins are as follows.

| | SP value $(MPa)^{1/2}$ | Difference in SP value |
|---|---|---|
| Paraffin wax | 17.3 | 0 |
| Polyethylene (LDPE) | 17.9 | 0.6 |
| Polyethylene (HDPE) | 18.7 | 1.4 |
| Homo-polypropylene (h-PP) | 16.4 | 0.9 |
| Cyclic olefin copolymer (COC) | 13.8 | 3.5 |

-continued

| | SP value $(MPa)^{1/2}$ | Difference in SP value |
|---|---|---|
| Ethylene vinyl alcohol copolymer (EVOH) | 18.9 | 1.6 |
| Polyethylene terephthalate (PET) | 22.7 | 5.4 |
| PET-G | 20.4 | 3.1 |

Here, PET-G is an amorphous polyethylene terephthalate, which is a copolymeric polyethylene terephthalate containing a copolymer component.

When the paraffin wax is used for the wax 3, an acyclic olefinic resin such as polyethylene and polypropylene can be used preferably as the resin for forming the underlying layer 1 on the surface of the formed body.

The resins having SP values different from that of the wax 3 within the aforementioned range are usually acyclic olefinic resins although it may vary depending on the type of the wax 3 in use, since the SP value of the wax 3 is substantially equal to that of the paraffin wax. The examples include random or block copolymers of α-olefins such as low-density polyethylene, high-density polyethylene, polypropylene, poly1-butene, poly4-methyl-1-pentene or ethylene, propylene, 1-butene, 4-methyl-1-pentene, (meth)acrylic acid, (meth)acrylic acid ester, and vinyl acetate.

Even a resin such as a cyclic olefinic copolymer (COC) whose SP value is different considerably from that of the wax 3 can be used as the resin for the underlying layer 1 if it is blended with a resin having a small difference in the SP value thereby making the difference in the SP value in the blended state be not more than 1.5 $(MPa)^{1/2}$.

Although the thickness of the aforementioned wax-absorbent underlying layer 1 is not limited in particular, typically it is 5 to 200 μm, and in particular, it is preferably about 10 to about 100 μm. When the underlying layer 1 is too thin, the absorption amount of the wax 3 is decreased, making it difficult to form the metaball steric layer 5, whereby the hydrophobic effect imparted by the surface irregularities may be decreased. On the other hand, when the underlying layer 1 is thicker than required, substantially the whole of the wax 3 in use may be absorbed easily into the underlying layer 1, and as a result, control for forming the structure shown in FIG. 1 or FIG. 2 may be difficult, for example. In this case, the fine particles 7 may be often distributed directly on the surface of the underlying layer 1, the power for holding the fine particles 7 may deteriorate to easily cause dropout of the fine particles 7, and thus, it may be difficult to keep stable slipperiness.

Further it is preferable in the present invention that the resin selected to be used for the underlying layer 1 (underlying resin) has a crystallinity of not more than 60%, or preferably not more than 50%, under the temperature condition for allowing the melted wax 3 to be absorbed into the underlying layer 1, so that the wax-absorbing capacity of the aforementioned wax-absorbent underlying layer 1 can be used effectively. In other words, it is preferable to allow the melted wax 3 to be absorbed into the underlying layer 1 in a state that the crystallinity is maintained within the range and at a temperature lower than the melting point of the underlying resin. Namely, in an attempt to allow the melted wax 3 to be absorbed into the underlying layer 1 in a state where the underlying resin has a high crystallinity, the absorbency of the wax 3 deteriorates due to presence of a large amount of crystal components even if the compatibility between the resin and the wax 3 is favorable. As a result, the wax absorption amount may be insufficient, making it difficult to form the metaball steric layer 5 as shown in FIG. 1. Further, there is a concern that the structure as shown in FIG.

2 with the fine particles 7 protruding from the thin layer 3a of the wax 3 cannot be formed.

Since the crystallinity of the underlying resin can be measured from the DSC temperature-rise curve of the resin, the wax 3 may be allowed to be absorbed into the underlying layer 1 based on this curve, at a temperature in a range to make the crystallinity as mentioned above be within the range and lower than the melting point of the resin.

Wax 3;

The wax 3 in the present invention is used as a dispersion medium for the fine particles 7, and it exhibits hydrophobicity without impairing the slipperiness also in the form distributed on the surface of the underlying layer 1.

For example, paraffin wax is produced in a petroleum refining process and it is white and solid at a room temperature. It is formed mainly of linear paraffin having about 20 to about 30 carbon atoms and contains a small amount of isoparaffin.

An example of plant wax is Carnauba wax, which is a solid collected from carnauba palm, having a color in a range of pale yellow to light brown. Its main component is hydroxy acid ester having 16 to 34 carbon atoms.

Among the examples in the present invention, a wax 3 having a melting point in a range of 50 to 100° C. is particularly preferable. When the melting point of the wax 3 is too low, the wax 3 may flow in use of the structured body 10 during the summer season for example, and therewith the metaball steric layer 5 in FIG. 1 and the thin layer 3a of the wax 3 shown in FIG. 2 may be dropped out. When the melting point of the wax 3 is too high, there may be a necessity of raising the heating temperature for the wax 3 to be absorbed into the underlying layer 1, which may limit the forming operation to extrusion or impair efficient absorption of the wax 3 into the underlying layer 1.

Further in the present invention, synthetic hydrocarbon wax, plant wax, animal wax, mineral wax and the like can also be used as long as the melting points are within the aforementioned range.

When an acyclic olefinic resin is used for example for the underlying layer 1, the wax 3 used in the present invention is preferably paraffin wax, polyethylene wax, or microcrystalline wax. These waxes have SP values different from that of the acyclic olefinic resin that forms the underlying resin and the difference in the SP values is within the aforementioned range, and thus, they exhibit high compatibility with the underlying layer 1. Since the wax 3 is absorbed into the underlying layer 1 through diffusion, the absorption rate relies on the molecular weight of the wax 3, and the absorption is retarded by the increase in the molecular weight. The average molecular weight (Mn) of the wax 3 used in the present invention is not more than 10000, preferably not more than 5000, and the most preferably not more than 1000.

The wax 3 is absorbed into the underlying layer 1 in the present invention, which can be confirmed by comparing the DSC temperature-rise curve for the underlying layer 1 with that for a simple underlying resin. Namely, when the wax 3 is absorbed in the underlying layer 1, this can be confirmed by the endothermic peak (this may be seen as a shoulder depending on the absorption amount) formed in the temperature range lower than the melting point of a simple underlying resin. This can also be confirmed by extraction using a solvent from the underlying layer 1.

Fine Particles 7;

The fine particles 7 in FIG. 1 are used as a roughening material, which is an essential material for forming the metaball-shaped wax layer 5. In a case of simply allowing the wax 3 to be absorbed into the underlying layer 1 and forming the wax layer 5 on the underlying layer 1, melted wax 3 would be just coated on the underlying layer 1 without blending the fine particles 7. In such a case, however, since the wax layer 3 does not have a metaball shape, the surface of the wax layer 5 would not have a rugged surface. Therefore, it would be necessary to form a rugged surface by a post-treatment such as a blast treatment or etching. Slipperiness can be imparted even by such treatments. However, a special apparatus for the post-treatment would be necessary, which would impair the advantage of the present invention of enabling cost reduction by forming the wax layer 5 without use of an organic solvent. Another limitation is that the formed body provided with the underlying layer 1 would be required to have a form suitable for the post treatment. When the formed body had a form of bottle for example, the post-treatment would be difficult. Further, even if the wax layer 5 having a rugged surface could be formed, a metaball shape having voids 9 inside thereof would not be formed, and thus, the slipperiness also would be inferior in comparison with the wax layer 5 shown in FIG. 1.

Therefore in the present invention, it is the most preferable to use the fine particles 7 as the roughening material so as to form the metaball-shaped wax layer 5 as shown in FIG. 1.

The fine particles 7 used as the roughening material are not limited in particular as long as they are not absorbed into the underlying layer 1 but remains on the underlying layer 1 while maintaining its granular shape at the time the fine particles 7 are blended in the melted wax 3 and coated on the underlying layer 1. Preferable examples thereof typically used include particles of inorganic oxides such as silica, titanium oxide and alumina, and carbonates such as calcium carbonate.

For forming a metaball-shaped wax layer 5 where the metaballs 5a have a diameter (equivalent circle diameter) within the aforementioned range (20 to 200 nm, in particular 50 to 150 nm), the fine particles 7 preferably have a primary particle diameter (or minimum structural unit) in a range of 3 nm to 1 μm, preferably 5 nm to 500 nm, and further preferably 10 nm to 200 nm. In the present invention, the fine particles 7 are estimated to function as cores of the metaballs 5a forming the metaball-shaped wax layer 5, and the metaball size is considered as relying on the primary particle diameter of the fine particles 7 in use. Therefore for forming a metaball-shaped wax layer 5 exhibiting excellent slipperiness to a moisture-containing content in the present invention, fine particles 7 having an average primary particle diameter within the aforementioned range are used preferably.

The average primary particle diameter of the fine particles 7 can be measured in observation with a scanning electron microscope.

It is further preferable that the surfaces of the aforementioned fine particles 7 are modified and hydrophobized with functional groups that exhibit a critical surface tension of not more than 30 mN/m. Examples of the functional group include alkyl groups such as a methyl group, alkylsilyl groups such as a methylsilyl group, a fluoroalkyl groups, and a fluoroalkylsilyl groups. Due to introduction of the hydrophobic functional group, for example at the time of dispersing the fine particles 7 in the melted wax 3, a favorable dispersion may be obtained, the wax 3 may be held in the vicinity of the fine particles 7, the metaball-shaped wax layer 5 may be formed easily, and, a wax layer 5 free from partial defects can be formed uniformly.

For example, in the present invention, when 20 μL of pure water is dropped onto the surface of the wax layer 5 formed with linked metaballs 5a containing the thus hydrophobized fine particles 7, a sliding angle defined as an angle on the surface on which the pure water slips is set to be 5° or less, whereby the slipperiness to the viscous content containing moisture can be enhanced remarkably.

Modification with these hydrophobic functional groups is performed through coupling by use of a hydrophobizing agent (such as a silane compound, a siloxane compound, a silazane compound, and a titanium alkoxide compound) and through coating by use of a fatty acid, metal soap or the like.

In the present invention, from the viewpoint of cost and availability, hydrophobic fine particles 7 used most preferably are hydrophobic silica fine particles and calcium carbonate fine particles. The most preferable fine particles are: hydrophobic silica fine particles surface-modified with dimethylsilyl groups, trimethylsilyl groups, or surface-covered with silicone oil; and calcium carbonate fine particles surface-covered with fatty acid or metal soap.

As shown in FIG. 1, the aforementioned fine particles 7 are present distributed inside the metaballs 5a forming the wax layer 5. For the purpose of allowing easy formation of the surface structure and exhibiting excellent slipperiness, the surface distribution amount is usually preferred to be in a range of 30 to 900 mg/m$^2$, in particular 300 to 600 mg/m$^2$, although it somewhat varies depending on the primary particle diameter.

Formation of Surface Structure Having Hydrophobic Rugged Surface;

The hydrophobic rugged surface for forming the surface structure of the structured body 10 is formed using a solventless coating composition (hereinafter, called as wax composition) containing the fine particles 7 and the melted wax 3 as described above. Namely, a formed body including a wax-absorbent underlying layer 1 on the surface is formed in advance, and a wax composition containing the melted wax 3 is coated on the surface of this formed body by spraying, roller-coating, knife-coating or the like. The surface is further heated and held to maintain the melted state of the wax, thereby allowing the wax 3 to be absorbed into the underlying layer 1 on the surface, so that the structured body 10 having a desired surface structure can be obtained (hereinafter, this method is called coating method).

In the coating method, it is essential that the heating temperature for allowing the melted wax 3 to be absorbed into the underlying layer 1 is equal or higher than the melting point of the wax 3, in particular preferred to be equal to or higher than the glass transition point (Tg) of the underlying resin layer 1 and lower than the melting point of the underlying resin. As mentioned above, a temperature at which the crystallinity of the underlying resin is not more than a predetermined range is preferred.

Specifically, when the melting point of the underlying resin is X° C., the heating temperature Y is preferably set to satisfy the following conditional formula:

$$X-5 \geq Y \geq X-50.$$

It is more preferable to heat and hold the wax melt at such a temperature for a time period of 5 seconds to 10 minutes, in particular about 10 seconds to 5 about minutes. When the heating temperature Y° C. is too low with respect to the melting point X° C. of the underlying resin, a lot of crystals may remain in the underlying layer 1. The remaining crystals may impair absorption of the wax 3 into the underlying layer 1, and as a result, formation of the wax layer 5 as shown in FIG. 1 may requires a long time, and it tends to cause disadvantage in productivity. When the heating temperature Y° C. is approximate to the melting point X° C. of the underlying resin, the absorption of the wax 3 may be so rapid that most of the wax 3 in the melt may be absorbed into the underlying layer 1 for a short time. This may make it difficult to keep the amount of the wax 3 on the underlying layer 1 necessary for forming the wax layer 5 as shown in FIG. 1. Crystallinity of the underlying resin under the heating condition to satisfy the above conditions is 60% or less, in particular in a range of 5 to 50%. Crystallinity of the underlying resin under the heating condition can be calculated, for example, from the crystal melt peak obtained from the DSC temperature-rise curve.

Alternatively, this heating can be performed after the wax in the wax composition coated on the surface is cooled to solidify.

According to the coating method, it is possible to easily form the aforementioned surface structure on the whole surface of the structured body 10 (formed body). Alternatively, it is possible to form the aforementioned surface structure by selectively setting the position for coating with the wax composition so as to limit the coating to a part of the surface of the structured body 10.

Further in the present invention, the aforementioned surface structure can be formed by the co-extrusion.

In this method, a wax-absorbent underlying resin and the aforementioned wax composition are co-extruded so that the wax-composition is adjacent to the surface side of the underlying resin, whereby the formed body provided with the aforementioned surface structure and the underlying layer 1 can be formed at one time. In this case, since both of the wax 3 in the wax composition and the underlying resin are adjacent to each other in the melted state, the wax 3 is rapidly absorbed into the underlying layer 1, and this provides an advantage that no special heating treatment is needed to allow the wax 3 to be absorbed into the underlying layer 1. This method is capable of easy formation of a surface structure where the hydrophobic fine particles 7 are distributed protruding from the thin layer 3a of the wax 3 as shown in FIG. 2, but may be inappropriate for forming the metaball steric layer 5 as shown in FIG. 1, since temperature control after the extrusion is difficult.

In any of the aforementioned coating method and the co-extrusion, the concentration of the hydrophobic fine particles 7 in the wax composition in use is set to perform easily coating or co-extrusion using this composition so that the aforementioned surface structure shown in FIG. 1 or FIG. 2 is formed easily. Usually, the concentration is not more than 50 parts by mass or less, in particular 3.0 to 10.0 parts by mass, and most preferably about 5.0 to about 8.0 parts by mass per 100 parts by mass of wax.

In the present invention, it is possible to form a predetermined surface structure without using an organic solvent, by any of the aforementioned methods.

Layer Structure of Structured Body 10;

The structured body 10 of the present invention may have various forms as long as the aforementioned wax 3 is absorbed into the underlying layer 1 on the surface of the formed body having a predetermined shape and the surface structure shown in any of FIG. 1 and FIG. 2 is formed on the surface of the underlying layer 1.

For example, the formed body may be a single-layer structured body composed of only the underlying resin that forms the underlying layer 1, and the surface structure as shown in FIG. 1 or FIG. 2 may be formed on the surface of this single-layer structured body. Alternatively, a structured body having the underlying layer 1 formed on a surface of glass, a metal foil, paper or the like can be used as a formed body. In particular, when the structured body 10 of the present invention is used as a lid of a container, a formed body prepared by laminating the underlying layer 1 on a paper or a metal foil is often used.

In the present invention, it is also possible to use a formed body of a multilayer structured body prepared by laminating the underlying layer 1 with any other resin layer, and to form thereon the surface structure shown in FIG. 1 or FIG. 2.

The multilayer structure is prepared, for example, by forming a layer structure where an oxygen-barrier layer and/or an oxygen-absorbing layer is laminated on one surface of the underlying resin layer 1 suitably via a layer of an adhesive resin, and further laminating a layer of the same resin as the resin of the resin layer 1 or a polyester resin such as polyethylene terephthalate. This multilayer structure is employed in particular when the structured body 10 is used as a container.

The oxygen-barrier layer in the multilayer structure is formed of, for example, an oxygen-barrier resin such as ethylene vinyl alcohol copolymer and polyamide. Any other thermoplastic resin may be blended with the oxygen-barrier resin as long as the oxygen-barrier property is not impaired.

Further as described in JP-A-2002-240813 for example, the oxygen-absorbing layer is a layer including an oxidizable polymer and a transition metal-based catalyst. The oxidizable polymer is oxidized by oxygen due to the action of the transition metal-based catalyst, thereby absorbing the oxygen to block permeation of the oxygen. Since the oxidizable polymer and a transition metal-based catalyst are described in detail in the JP-A-2002-240813, the detailed description is omitted here. Representative examples of the oxidizable polymer include an olefinic resin having a tertiary carbon atom (such as polypropylene, polybutene-1, or a copolymer thereof), thermoplastic polyester or aliphatic polyamide, a xylylene group-containing polyamide resin, and ethylenically unsaturated group-containing polymer (such as a polymer derived from a polyene such as butadiene). Representative examples of the transition metal-based catalyst include inorganic salts, organic acid salts or complex salts of transitional metals such as iron, cobalt and nickel.

The adhesive resins used for adhering the respective layers are known per se, and examples of the adhesive resin include carboxylic acids such as maleic acid, itaconic acid, fumaric acid or an anhydride thereof; olefin resins graft-modified with amide, ester or the like; an ethylene-acrylic acid copolymer; an ion-crosslinked olefinic copolymer; and an ethylene-vinyl acetate copolymer.

Thickness of each layer mentioned above can be set suitably in accordance with the properties required for the layer.

It is also possible to provide as an inner layer a regrind layer prepared by blending a scrap like a burr generated during forming of the structured body 10 having the aforementioned multilayer structure, with a virgin resin such as an olefinic resin.

Form of Structured Body 10;

The structured body 10 of the present invention can have various forms. In particular, it is used preferably in the form of packaging materials such as packaging containers, lids and caps since slipperiness (namely, non-adhesiveness and a slip-down property) with respect to a moisture-containing viscous material can be improved.

As mentioned above, in particular a lid is often formed by laminating the underlying layer 1 on a paper or a metal foil. An embodiment where the aforementioned surface structure is formed on the inner surface of the lid is advantageous in preventing adhesion of viscous gel-like or pudding-like products like yogurt. This embodiment may provide another advantage. That is, since the underlying layer 1 absorbs the wax 3, the softening point is lowered or the thin layer 3a of the wax 3 is formed on the underlying layer 1, thereby improving the heat-sealing property.

The form of the container to which the present invention is preferably applied is not limited in particular, but it can be selected in accordance with the material of the container, and the examples include a cup, a bottle, a bag (pouch), a syringe, a pot, a tray, a paper dish, and a paper tray. Alternatively, the container may be formed by stretching. Examples other than container include cutlery like a spoon, a fork and a china spoon, kitchen equipment and a lid.

Such a container is provided by forming a pre-formed body having the aforementioned underlying layer 1 by a known method and by subjecting the formed body to post-treatments such as film bond by heat-sealing, vacuum molding such as a plug-assist molding, and blow-molding.

Further, the container having on its inner surface the surface structure as shown in FIG. 1 and FIG. 2 can be obtained by spray-application and co-extrusion in accordance with the form. For example, a wax heated to be liquefied is applied on the surface of the underlying layer by spraying or coating with a roller or a knife coater. Alternatively, as described in JP-A-2013-91244 A (PCT/JP2014/61565), the wax in a form of mist may be fed with a blow liquid from a feeding tube for the blow liquid, or it may be fed onto the inner surface by co-extrusion with the resin to constitute the underlying layer.

Figure 4:
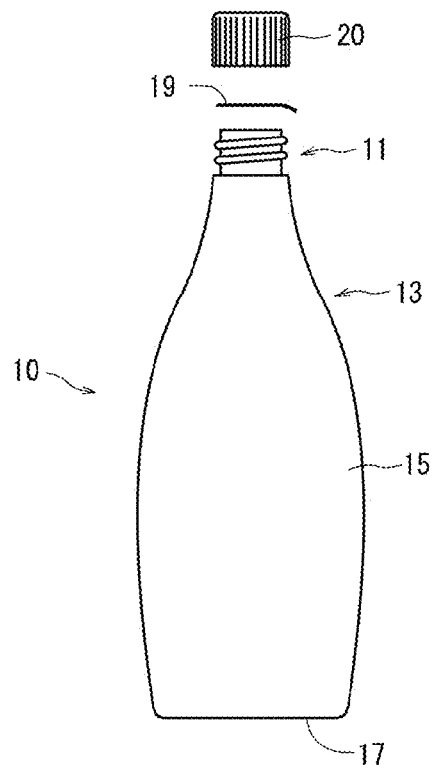
[FIG. 4]: a view showing a directly blown bottle as a preferred embodiment of structured body of the present invention.

FIG. 4 shows a directly blown bottle, which is the most preferable form of the structured body 10 of the present invention.

The bottle-shaped structured body indicated as 10 as a whole in FIG. 4 has a screwed neck portion 11, a body portion wall 15 linked to the neck portion 11 through a shoulder portion 13, and a bottom wall 17 that closes the lower end of the body portion wall 15. The inner surface of the bottle 10 is formed of the resin layer 1 into which the aforementioned wax 3 is absorbed. On the inner surface, a surface structure is formed, on which the fine particles 7 are distributed protruding from either the metaball steric layer 5 or from the thin layer 3a of the wax 3.

Since the structured body 10 has a great slipperiness with respect to a moisture-containing viscous substance, and thus, it is most preferred as a bottle to be filled with viscous contents having a viscosity of 100 mPa·s or more at 25° C. Examples of the viscous contents include ketchup, aqueous paste, honey, sauces, mayonnaise, mustard, dressing, jam, chocolate syrup, cosmetic liquid such as emulsion, liquid detergent, shampoo, rinse and the like.

EXAMPLES

The invention will be described by way of the following Examples.

Described below are a variety of properties, methods of measuring physical properties, and resins used for forming the structured bodies in Examples described below.

1. Measurement of Slip-Down Angle of Viscous Content

A test piece measuring 30 mm×50 mm was cut out from a multilayer structured body prepared by a method described later.

A solid-liquid interface analysis system DropMaster 700 manufactured by Kyowa Interface Science Co., Ltd. was used under a condition of 23° C.-50% RH. The test piece was fixed such that its surface formed with a rugged surface structure would face upward. A content of 30 mg was placed on the test piece and the test piece was tilted gradually at a rate of 1°/min to measure an angle at which a slip-down occurs, namely a slip-down angle. When the value of this slip-down angle is smaller, the content has more favorable slip-down property. The viscous content used here is as follows.

Viscous Content in Use: Strawberry Jam

2. Measurement of Slip-Down Angle of Distilled Water (Application Experiments 1 to 7)

A test piece measuring 20 mm×50 mm was cut out from a laminated structured body prepared by a method mentioned later. A solid-liquid interface analysis system DropMaster 700 manufactured by Kyowa Interface Science Co., Ltd. was used under a condition of 23° C.-50% RH. The test piece was fixed such that its surface formed with a rugged surface structure would face upward. Distilled water of 30 mg was placed on the test piece and the test piece was tilted gradually at a rate of 1°/sec to measure an angle at which a slip-down of the distilled water occurs, namely a slip-down angle. When the value of this slip-down angle is smaller, the test piece is evaluated as having more favorable slip-down property.

3. Measurement of Surface Shape by Atomic Force Microscope

A test piece measuring 10 mm×10 mm was cut out from a multilayer structured body prepared by a method mentioned later.

The surface provided with the rugged surface structure (hydrophobic rugged surface) was determined as a measurement surface to be subjected to measurement of surface shape of the multilayer structured body by using an atomic force microscope (NanoScopeIIIb manufacture by Digital Instruments, Inc.). The measurement conditions are as described below.

Cantilever: resonance frequency $f_0$=363-392 kHz
Spring constant k=20-80 N/m
Measuring mode: tapping mode
Scanning range: 50 μm×50 μm
Number of scanning lines: 256

By using software (Nanoscope: Version 5.30r2) attached to the atomic force microscope, a surface area S of the scanned range (2500 μm$^2$) was obtained from the thus obtained data of the three-dimensional shape so as to calculate a specific surface area r. The specific surface area r is given by the following formula (1).

$$r=S/S_0 \quad (1)$$

In the formula, S is a surface area obtained from the surface shape profile, and $S_0$ is a scanned area (2500 μm$^2$).

4. Form Observation of Rugged Surface Structure by SEM

A test piece measuring 30 mm×50 mm was cut out from a multilayer structured body prepared by a method described later.

The test piece was fixed such that the surface formed with a rugged surface structure would face upward. The test piece surface was coated with a metal thin film of Pt by using an ion sputter (E-1045 Ion sputter manufactured by Hitachi High-Technologies Corporation) under a condition of discharge current of 20 mA and treatment time of 40 sec.

After that, respective samples prepared in Examples 1 to 3 and Comparative Examples 1, 2 were observed at 10000 times and 100000 times magnifications by using a field emission scanning electron microscope (S-4800 manufactured by Hitachi High-Technologies Corporation) to check the forms of the rugged surface structures. The respective samples prepared in the Application experiments 1 to 7 were subjected to surface observation at 50000 times magnification.

5. Observation of Cross Section of Rugged Surface Structure by TEM

A multilayer structured body prepared by a method described later was fixed with an embedding resin and then frozen, from which a slice having a thickness of about 100 nm was cut out. The slice was observed with a transmission electron microscope (TEM).

6. Evaluation of Crystallinity of Underlying Layer Under Respective Heating Conditions (Application Experiments 1 to 7)

Slices each having weight of about 3 to about 5 mg were cut out from the material (a film mentioned later) used for the underlying resins. Each slice was placed in an aluminum crimp cell, and the crimp cell was lidded to crimp the slice, thereby preparing a sample for measurement. Regarding the thus prepared sample, crystallinity of the underlying resin under the respective temperature conditions was evaluated by using a differential scanning calorimeter (DiamondDSC manufactured by PerkinElmer Inc.) from a profile in the temperature-rise process of the sample. The temperature-rise conditions applied to the respective underlying resins are indicated below.

<LDPE, HDPE, h-PP>
Temperature rise from −50° C. to 200° C. at 10° C./min
<COC, EVOH, PET-G>
Temperature rise from −50° C. to 300° C. at 10° C./min From the result of the endothermic peak obtained by application of the aforementioned thermal history, the crystallinity of each resin was calculated by using the formula below.

$$\text{Crystallinity of underlying resin } (\%)=(\Delta H_0/\Delta Hm°) \times 100$$

In the formula, $\Delta H_0$: enthalpy of fusion (J/g) obtained by measurement
$\Delta Hm°$: enthalpy of fusion (J/g) of perfect crystal of each underlying resin For the value of $\Delta Hm°$ (J/g), the following value was applied with reference to literature values.

LDPE and HDPE; $\Delta Hm°$=293 J/g
h-P; $\Delta Hm°$=207 J/g
PET; $\Delta Hm°$=140 J/g For comparison, the endothermic peak of each resin and the enthalpy of fusion $\Delta H_T$ under the heating temperature conditions in Example, namely, enthalpy of fusion $\Delta H_{60}$, $\Delta H_{90}$, $\Delta H_{120}$ and $\Delta H_{150}$ of the resin at 60° C., 90° C., 120° C., 150° C. and 180° C., were measured. From the values, residual crystallinities under the respective heating temperature conditions were calculated.

<Wax>
Paraffin wax
Melting point: 50 to 52° C.
SP value ($\delta 1$): 17.3 (MPa)$^{1/2}$
Average molecular weight: 280

<Underlying Resin>
A film having a thickness of about 400 μm was prepared from respective materials to provide a test piece.
(For PET, a biaxially stretched film having thickness of 100 μm was used for evaluation.)

Low-Density Polyethylene (LDPE)
Melting point: 108° C.
Crystallinity: 30%
Glass transition point (Tg): −78° C.
SP value ($\delta 2$): 17.9 (MPa)$^{1/2}$
Difference in SP value from paraffin wax: 0.6

High-Density Polyethylene (HDPE)
  Melting point: 132° C.
  Crystallinity: 55%
  Glass transition point (Tg): −78° C.
  SP value (δ2): 18.7 (MPa)$^{1/2}$
  Difference in SP value from paraffin wax: 1.4
Homo-Polypropylene (h-PP)
  Melting point: 164° C.
  Crystallinity: 42%
  Glass transition point (Tg): about 5° C.
  SP value (δ2): 16.4 (MPa)$^{1/2}$
  Difference in SP value from paraffin wax: 0.9
Cyclic Olefin Copolymer (COC)
  Crystallinity: amorphous
  Glass transition point (Tg): 80° C.
  SP value (δ2): 13.8 (MPa)$^{1/2}$
  Difference in SP value from paraffin wax: 3.5
Ethylene Vinyl Alcohol Copolymer (EVOH)
  Melting point: 190° C.
  Glass transition point (Tg): 60° C.
  SP value (δ2): 18.9 (MPa)$^{1/2}$
  Difference in SP value from paraffin wax: 1.6
Polyethylene Terephthalate (PET)
  Melting point: 265° C.
  Glass transition point (Tg): 80° C.
  SP value (δ2): 22.7 (MPa)$^{1/2}$
  Difference in SP value from paraffin wax: 5.4
PET-G
  Crystallinity: amorphous
  Glass transition point (Tg): 80° C.
  SP value (δ2): 20.4 (MPa)$^{1/2}$
  Difference in SP value from paraffin wax: 3.1
<Roughening Fine Particles>
Hydrophobic Wet Silica
  Average particle diameter 2.8 μm, BET specific surface area 500 m$^2$/g
Hydrophobic Dry Silica
  Average primary particle diameter 7 nm, BET specific surface area 220 m$^2$/g
Hydrophobic Calcium Carbonate (Surface-Treated with Fatty Acid)
  Average primary particle diameter 30 nm, BET specific surface area 30 m$^2$/g
<Other Materials>
Base Material for Formation of Underlying Layer
  Normal base paper (Basis weight 250 g/m$^2$)
Binder Resin (Comparative Example 1)
  Aqueous polyethylene emulsion
  Components: resin component/solvent/distilled water=25/20/55 (weight ratio)
  Resin component: melting point=81° C., molecular weight=about 60,000

Example 1

Paraffin wax was used for the wax and hydrophobic wet silica was used for the roughening fine particles.

Further, a low-density polyethylene (LDPE) was used for the underlying resin. An underlying layer of this polyethylene (thickness: 20 μm) was formed on the surface of a normal base paper (250 g/m$^2$), and it was used as a formed body for forming a rugged surface.

A wax composition (solventless coating composition) was prepared by feeding paraffin wax (melting point: 50 to 52° C.) into a vial bottle with capacity 50 ml, heating to melt under a condition of 90° C., and by adding thereto hydrophobic wet silica. In this wax composition, the mixing ratio of the wax to the hydrophobic wet silica was 93:7 (weight ratio).

This wax composition was stirred while being heated under the condition of 90° C., and coated on an underlying layer (an LDPE layer having a thickness of 20 μm) on the surface of the formed body, using a bar coater (#3) heated to about 70° C., thereby producing a multilayer structured body.

This multilayer structured body was heated in an oven under a condition of 90° C.-5 min, thereby maintaining the melted state of the wax component contained in the coating layer of the wax composition, then cooling it at a room temperature.

The layer constitution, the component of the wax composition in use, and the type of the underlying resin for the multilayer structured body are shown in Table 1.

The multilayer structured body was also subjected to measurement of slip-down angle of the aforementioned viscous contents, measurement of surface shape, and observation of form of the rugged surface structure by SEM before and after heating in the oven. Table 2 shows the thus obtained values of slip-down angles and the values of specific surface areas of the rugged structure.

Figure 5:
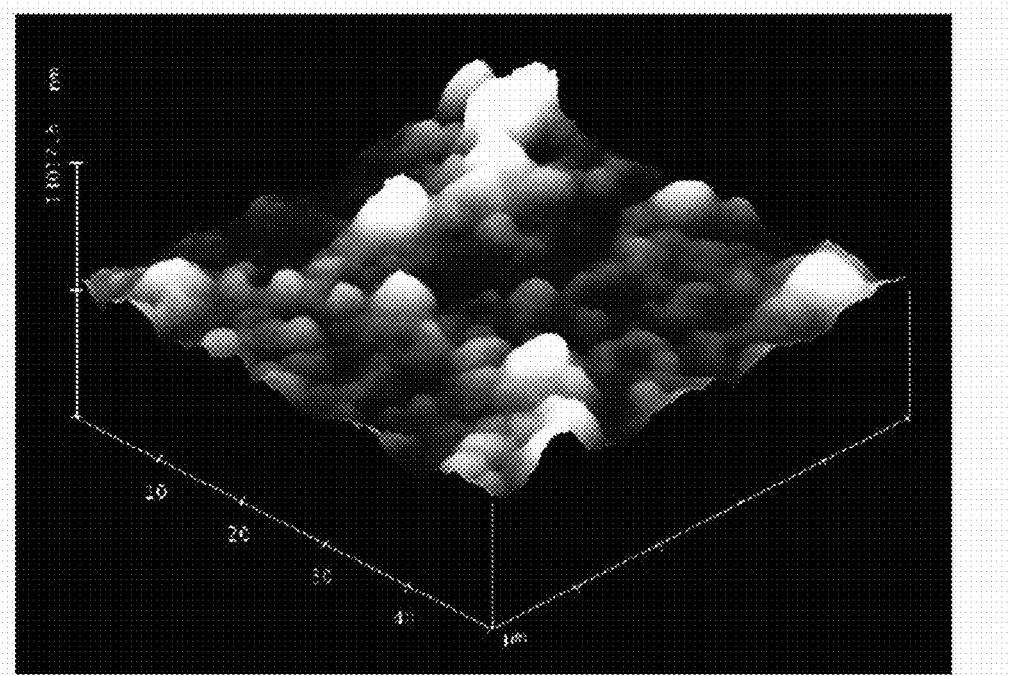
[FIG. 5]: a three-dimensional image obtained in Example 1 by a measurement of a surface shape using an atomic force microscope before a heating step.
Figure 6:
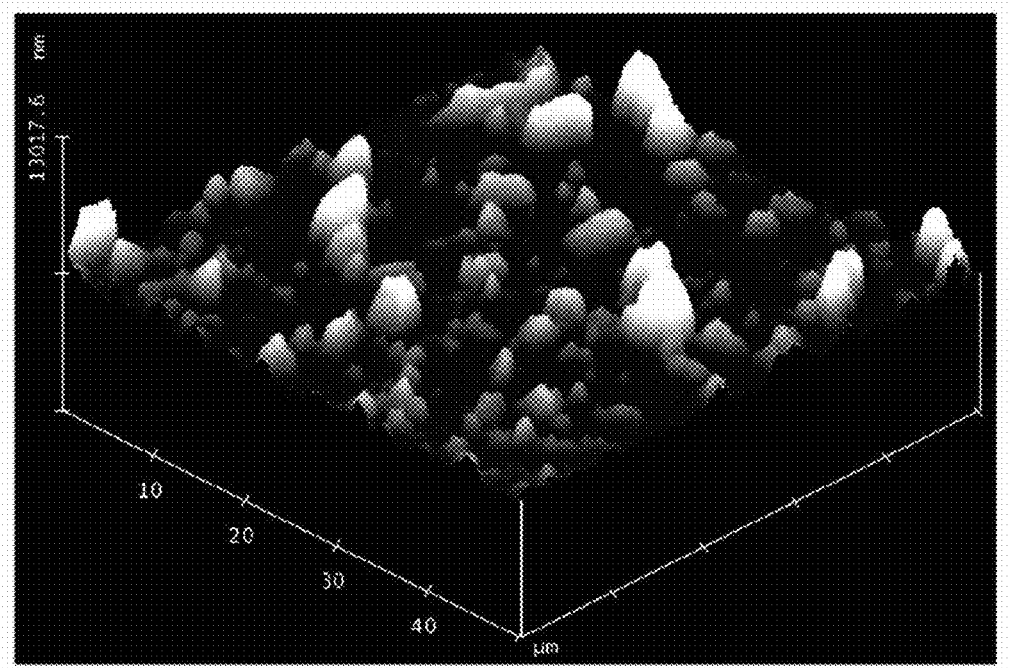
[FIG. 6]: a three-dimensional image obtained in Example 1 by a measurement of a surface shape using an atomic force microscope after a heating step.

FIG. 5 and FIG. 6 show three-dimensional images obtained by measurement of the surface shape. Further, FIG. 7, FIG. 8, FIG. 9, and FIG. 10 show observation images obtained by observation of form of the rugged surface structure by SEM.

Example 2

A wax composition was prepared through operations similar to those of Example 1 and a multilayer structured body was produced similarly to Example 1 except that the aforementioned hydrophobic dry silica was used as the roughening fine particles instead of the hydrophobic wet silica.

Figure 11:
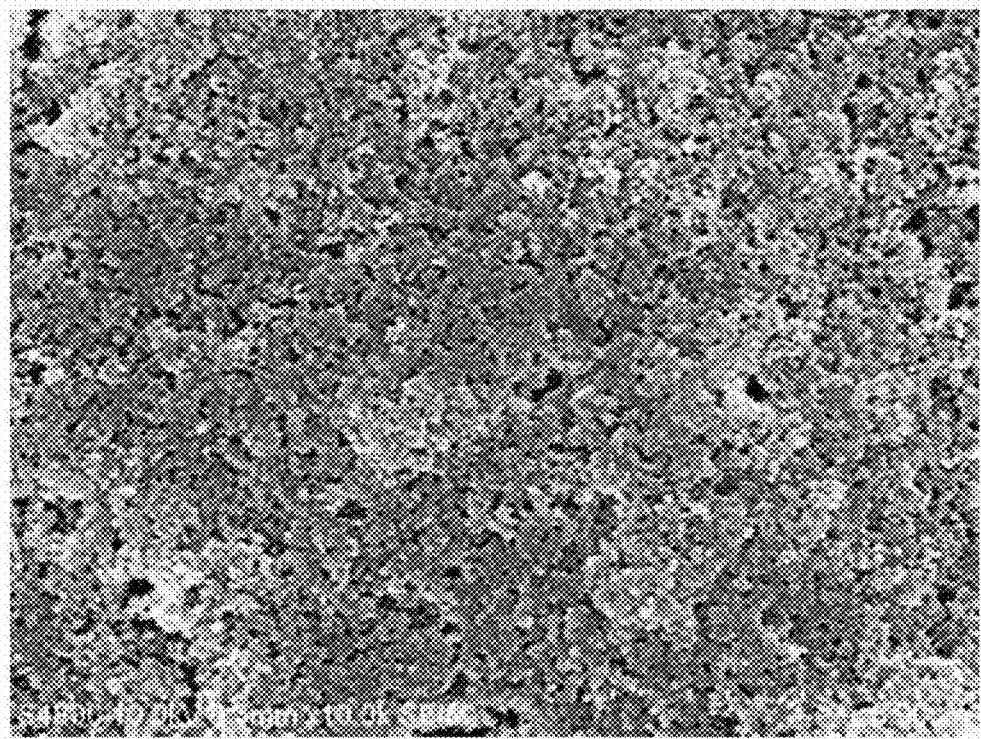
[FIG. 11]: an observation image (10,000 times) obtained in Example 2 by performing a surface observation using a scanning electron microscope after a heating step.
Figure 12:
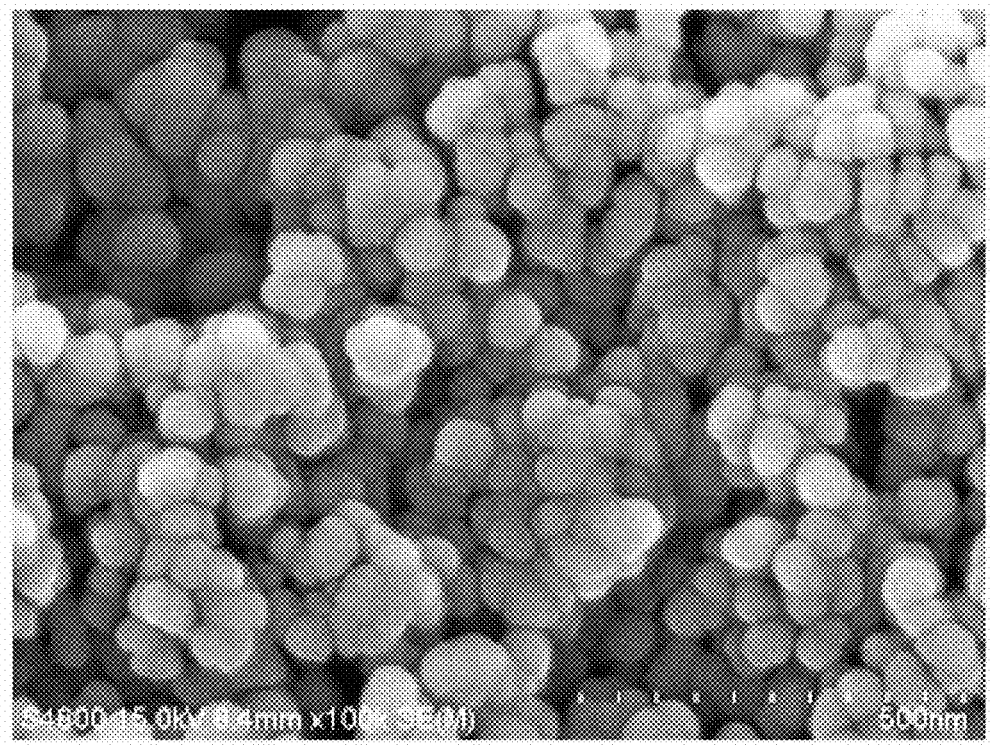
[FIG. 12]: an observation image (100,000 times) obtained in Example 2 by performing a surface observation using a scanning electron microscope after a heating step.
Figure 13:
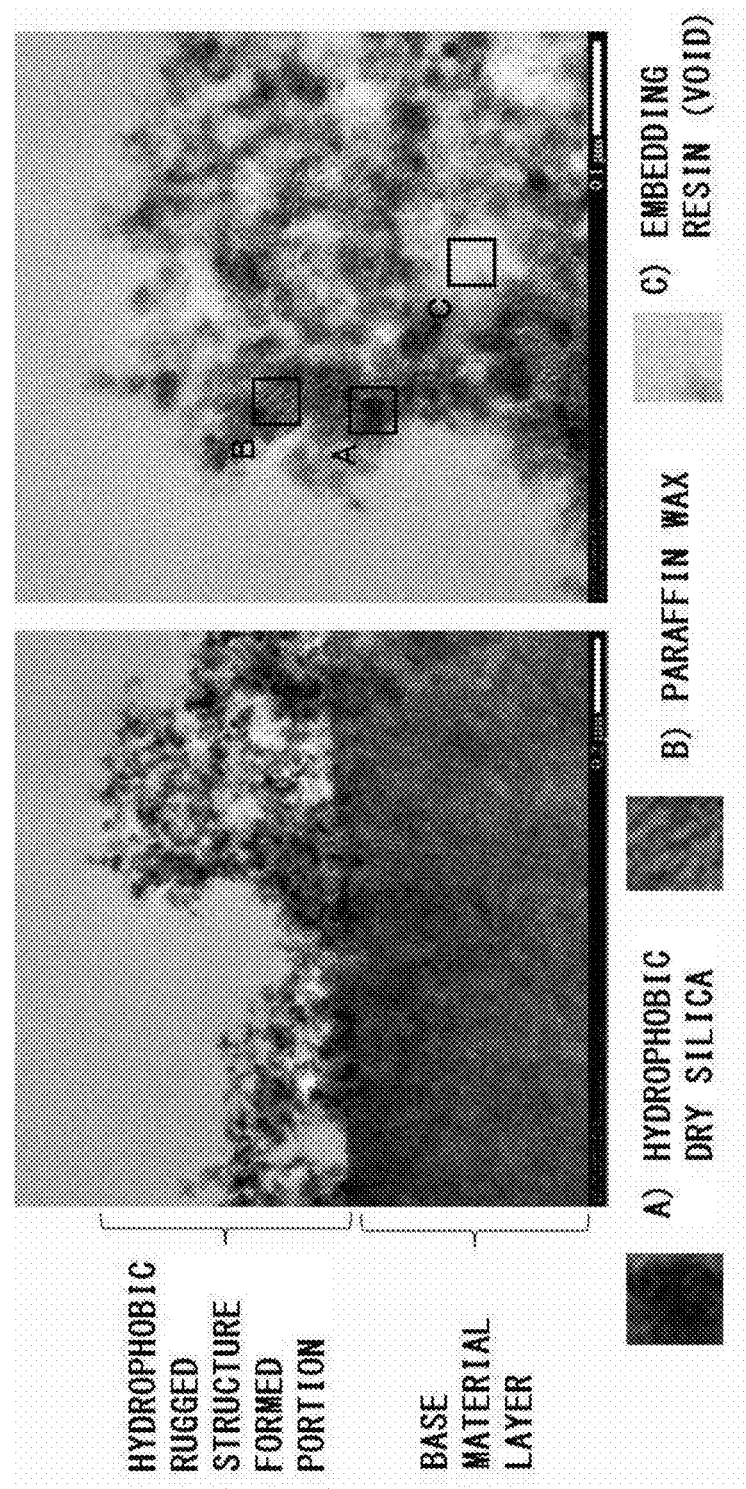
[FIG. 13]: an observation image obtained in Example 2 by performing a cross-section observation using a transmission electron microscope after a heating step.

Table 1 shows the layer constitution, the component of the wax composition in use and the type of the underlying resin for the multilayer structured body. Table 2 shows each measurement result before and after heating in an oven. FIG. 11 and FIG. 12 show observation images obtained by the result of form observation, and FIG. 13 shows an image obtained by observation of cross section.

Example 3

A multilayer structured body was produced similarly to Example 1 except that calcium carbonate was used as the roughening fine particles and the ratio of the paraffin wax to the hydrophobic calcium carbonate in the wax composition was set to 55:45 (weight ratio).

Figure 14:
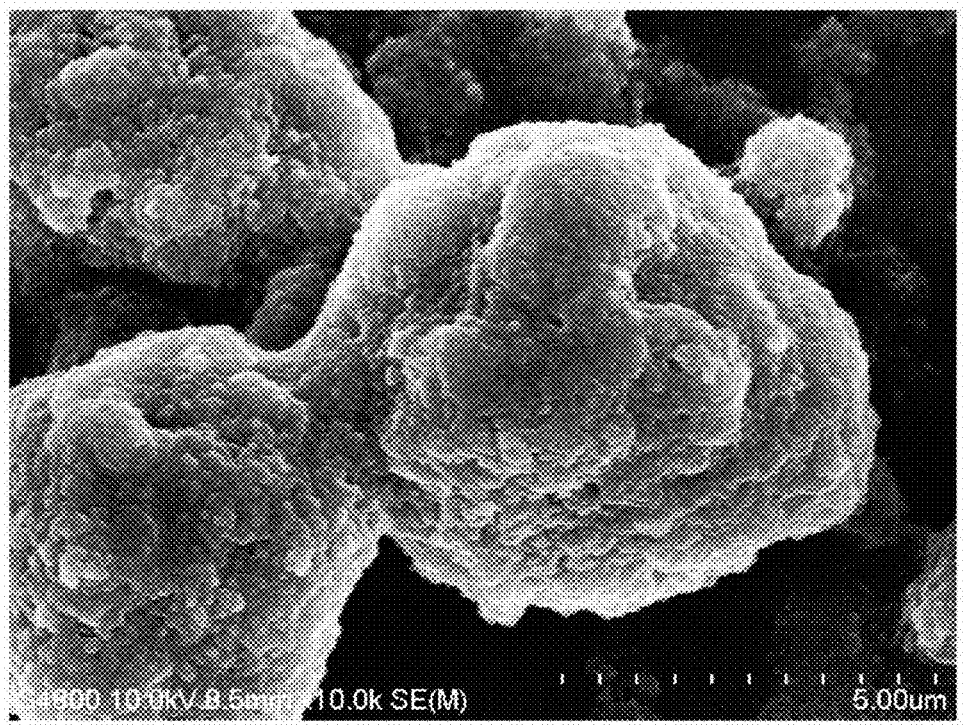
[FIG. 14]: an observation image (10,000 times) obtained in Example 3 by performing a surface observation using a scanning electron microscope after a heating step.
Figure 15:
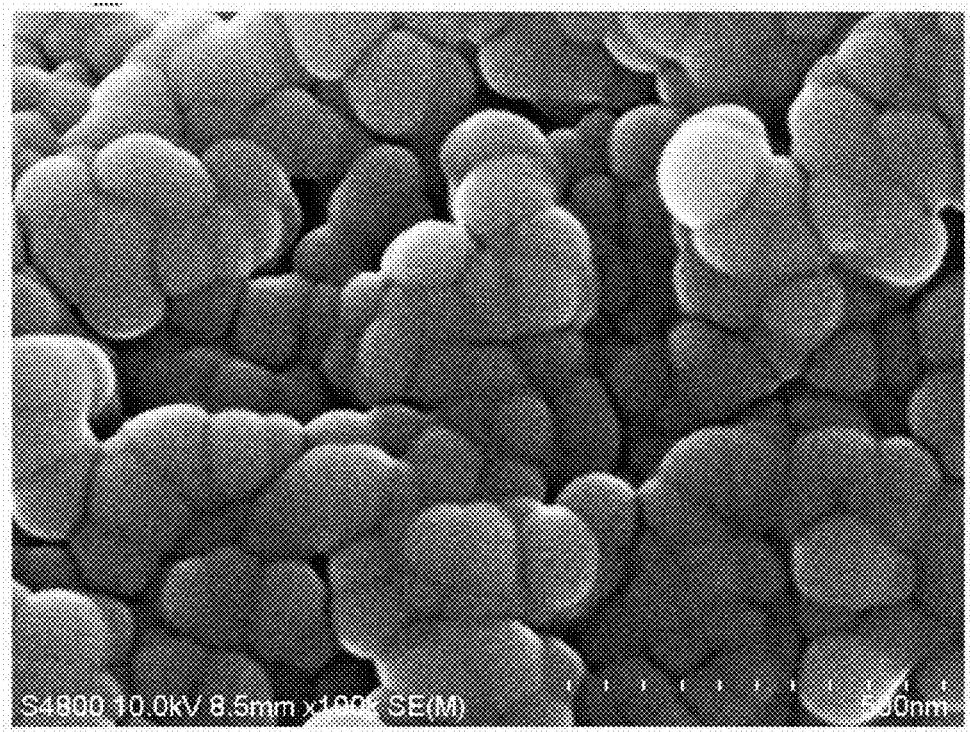
[FIG. 15]: an observation image (100,000 times) obtained in Example 3 by performing a surface observation using a scanning electron microscope after a heating step.

Table 1 shows the layer constitution, the component of the wax composition in use and the type of the underlying resin for the multilayer structured body. Table 2 shows each measurement result before and after heating in an oven. Further, FIG. 14 and FIG. 15 show observation images obtained by the result of form observation.

The basic layer constitution of the multilayer structured bodies prepared in the above Examples 1 to 3 is as follows when the inner surface is regarded as the surface where the hydrophobic rugged structure is formed.

Solventless coating layer/underlying resin layer (LDPE, 20 μm)/base material layer (base paper)

Comparative Example 1

Ethanol and distilled water as dispersion media were introduced into a vial bottle with capacity 50 ml, into which hydrophobic wet silica (roughening fine particles) and aqueous polyethylene emulsion (binder) were further fed to prepare a solvent coating composition of the components as follows.

ethanol/distilled water/hydrophobic silica/resin component in aqueous polyethylene emulsion=45/45/5/5 (weight ratio)

The solvent coating composition was coated on the surface of the underlying layer (LDPE, 20 μm) formed on the base material layer (base paper), by using a bar coater (#3), thereby preparing a multilayer structured body having basic components as described below.
Solvent Coating Layer/Underlying Resin Layer (LDPE, 20 μm)/Base Material Layer (Base Paper)

The prepared multilayer structured body was heated using an oven under a condition of 90° C.-5 min to melt the binder component contained in the solvent coating layer, and then cooled at a room temperature.

Table 1 shows the layer constitution, the component of the solvent coating composition in use and the type of the underlying resin for the multilayer structured body. Table 2 shows the respective measurement results before and after heating in an oven.

Comparative Example 2

A wax composition was coated on the underlying layer by a method similar to that of Example 1 except that a PET film (film thickness: 100 μm) was used as the underlying layer, thereby preparing a multilayer structured body composed of a solventless coating layer (wax composition)/PET film (100 μm).

This multilayer structured body was heated using an oven under a condition of 90° C.-5 min to melt the wax component contained in the solventless coating product layer, and then cooling the multilayer structured body at a room temperature.

Table 1 shows the layer constitution, the components of the solventless coating composition (wax composition) in use, and the type of the underlying resin for the multilayer structured body. Table 2 shows the result of the respective measurements before and after the heating by the oven.

TABLE 1

|  | Basic layer structure | Coating composition | Underlying layer |
|---|---|---|---|
| Ex. 1 | Coating layer (containing wax)/ underlying layer/ base material layer | Paraffin wax/ hydrophobic wet silica = 93/7 | LDPE |
| Ex. 2 | Coating layer (containing wax)/ underlying layer/ base material layer | Paraffin wax/ hydrophobic dry silica = 93/7 | LDPE |
| Ex. 3 | Coating layer (containing wax)/ underlying layer/ base material layer | Paraffin wax/ hydrophobic calcium carbonate = 55/45 | LDPE |
| Comp. Ex. 1 | Coating layer/ underlying layer/ base material layer | Ethanol/ distilled water/ hydrophobic wet silica/PE emulsion = 45/45/5/5 | LDPE |
| Comp. Ex. 2 | Coating layer (containing wax)/ underlying layer/ base material layer | Paraffin wax/ hydrophobic wet silica = 93/7 | PET |

TABLE 2

|  | Slip-down angle of viscous content (°) (strawberry jam) | | Specific surface area r of multilayer structure | |
|---|---|---|---|---|
|  | Before heating step | After heating step | Before heating step | After heating step |
| Example 1 | 90 (no slip-down) | 6 | 1.10 | 1.28 |
| Example 2 | 90 (no slip-down) | 4 | — | — |
| Example 3 | 90 (no slip-down) | 6 | — | — |
| Comparative example 1 | 90 (no slip-down) | 90 (no slip-down) | 1.18 | 1.30 |
| Comparative example 2 | 90 (no slip-down) | 90 (no slip-down) | 1.08 | 1.06 |

<Consideration>

The results in Table 1 and Table 2 indicate that the specific surface area of the multilayer structured body in Example 1 was 1.10 before the heating step (FIG. 5) while it was 1.28 after the heating step (FIG. 6), namely, the specific surface area of the multilayer structured body was increased.

Regarding the slip-down angle of the viscous content, the sample before the heating step had a slip-down angle of 90° (no slip-down), but the sample after the heating step had a slip-down angle of 6°. This indicates that the slip-down property was improved remarkably with the increase of the specific surface area of the sample surface.

Example 2 and Example 3 are examples each using hydrophobic dry silica or hydrophobic calcium carbonate as the roughening fine particles. Similarly to Example 1, both Examples show a result that the viscous content would not slip down before the heating step but the viscous content would slip down after the heating step.

On the other hand, in Comparative example 1, the specific surface area of the multilayer structured body was increased from 1.18 to 1.30 after the heating step, while the slip-down angle of the viscous content was 90° both before and after the heating step, indicating the slip-down property was not improved regardless of the heating. The reason is presumed as follows. That is, since the resin component used as the binder had a molecular weight as high as several tens of thousands, the resin component was not diffused sufficiently in the underlying layer and thus, sufficient voids were not formed.

Further in Comparative example 2, the specific surface area of the multilayer structured body did not change after the heating step. The slip-down angle of the viscous content was 90° both before and after the heating step, indicating that the slip-down property was not improved. Further the result of the surface observation shows that a layer where the hydrophobic fine particles and the wax were mixed was formed after the heating step, namely, the shape of the hydrophobic fine particles was not confirmed clearly.

Figure 7:
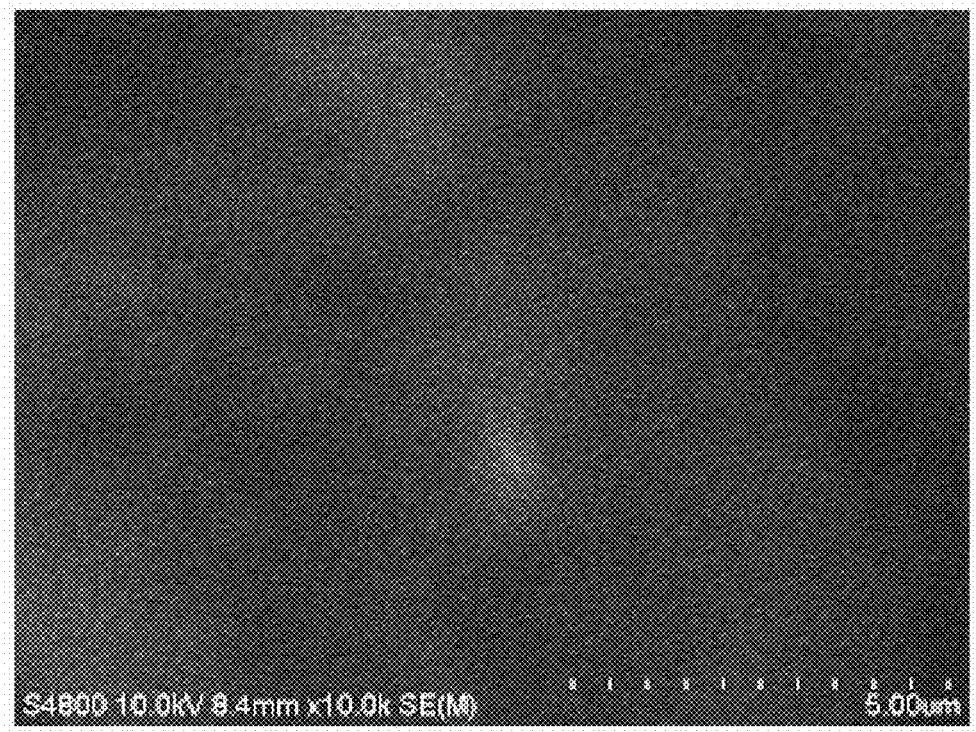
[FIG. 7]: an observation image (10,000 times) obtained in Example 1 by performing a surface observation using a scanning electron microscope before a heating step.
Figure 8:
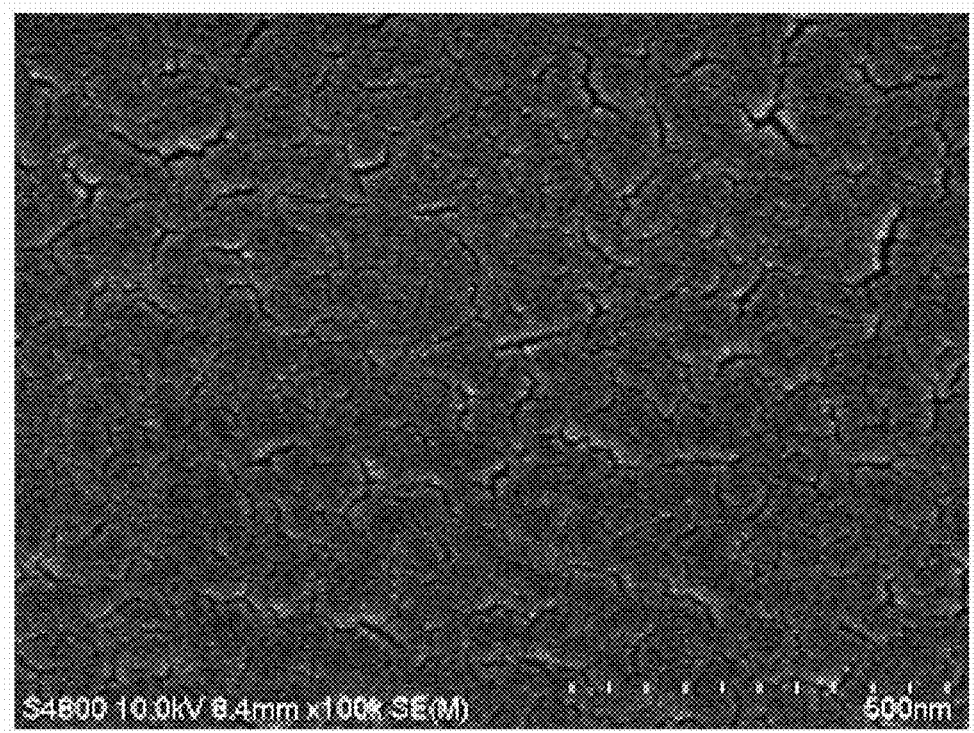
[FIG. 8]: an observation image (100,000 times) obtained in Example 1 by performing a surface observation using a scanning electron microscope before a heating step.

FIG. 7 and FIG. 8 show the result of observation of the surface state of the sample before the heating step in Example 1. The fine particles composed a layer mixed with the wax, where the rugged structure of the fine particles was not observed at all, namely, the surface was flat and smooth.

Figure 9:
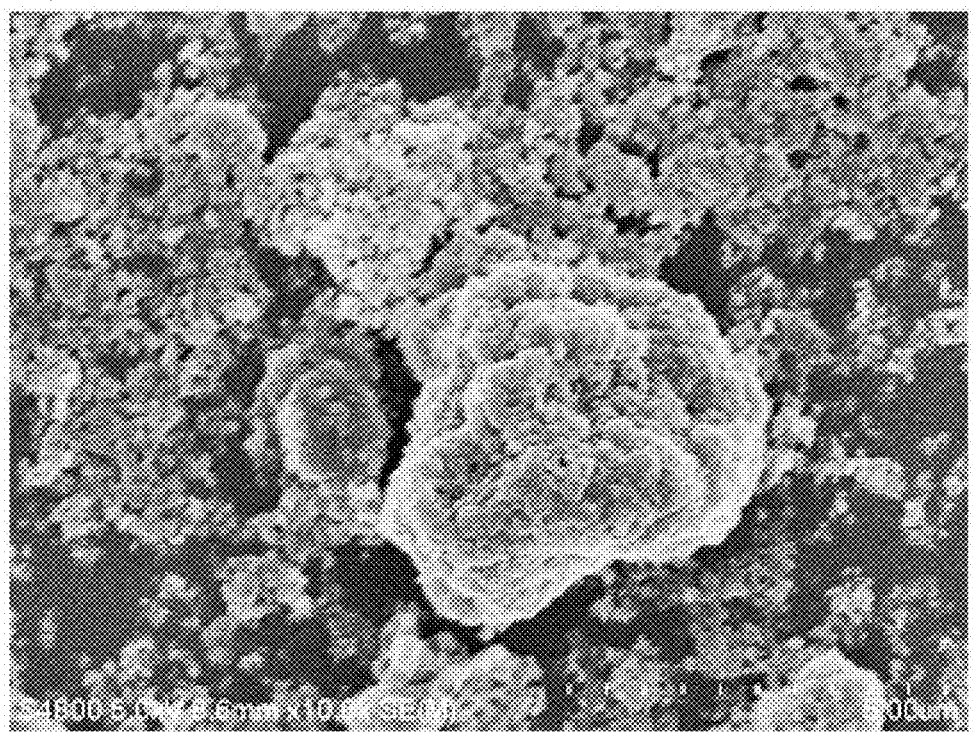
[FIG. 9]: an observation image (10,000 times) obtained in Example 1 by performing a surface observation using a scanning electron microscope after a heating step.
Figure 10:
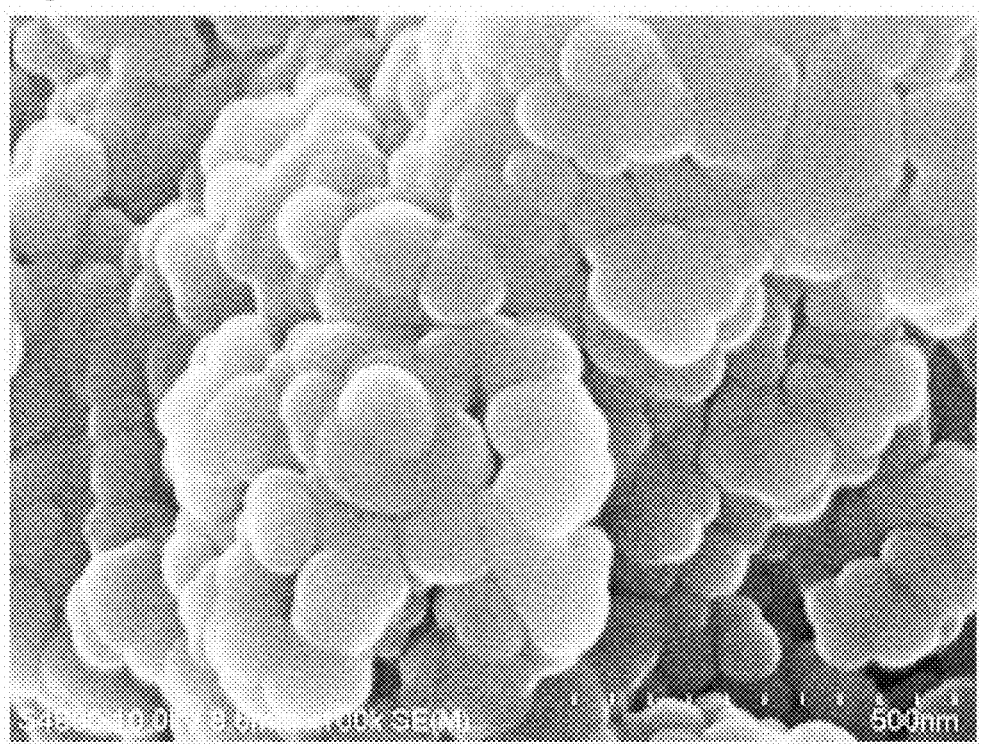
[FIG. 10]: an observation image (100,000 times) obtained in Example 1 by performing a surface observation using a scanning electron microscope after a heating step.

In contrast, in FIG. 9 showing a result of observation of the state of sample after the heating step in Example 1, a rugged structure was formed on the surface, indicating that the surface structure changed due to the heating. FIG. 10 is a magnified view of the surface to show the observation result, in which a metaball steric layer is formed. It was confirmed that each of spherical metaballs forming this steric layer had an equivalent circle diameter of about 100 nm.

FIG. 11 and FIG. 12 show results of observation of the surface form of the multilayer structured body after the heating step in Example 2. Apparently, the wax covered the fine particles similarly to Example 1 to form a metaball steric layer, in which each metaball had an equivalent circle diameter of about 50 nm.

FIG. 13 shows a result of observation of the cross section of the rugged surface structure in Example 2. In this figure, A (the black part) indicates presence of hydrophobic particles, and (B) indicates presence of wax. This clarifies that the surface rugged structure on the surface layer is formed of the hydrophobic particles and the wax.

FIG. 14 and FIG. 15 show a result of observation of the surface state in Example 3. Similarly to Example 1, surfaces of the fine particles are covered with the wax to form a metaball steric layer. Each metaball had an equivalent circle diameter of about 100 nm. It demonstrates that even fine particles other than the hydrophobic silica are capable of forming a similar rugged structure.

These results demonstrate that the respective samples exhibiting favorable liquid repellency are obtained by forming the rugged surface structures by the methods as in Examples 1, 2 and 3. That is, a coating composition containing wax in which roughening fine particles are dispersed and containing no solvent is coated on a underlying layer formed of a resin compatible with the wax, cooled, and then the wax component is melted through a heating step.

Formation of the rugged surface structure in the present invention is presumed as follows. The formed rugged surface structure has a rugged shape composed of a smooth curved plane, and hydrophobic fine particles having a nano-order average primary particle diameter are dispersed inside the irregularities. The scale of irregularities on the thus formed surface is about 100 nm, and a main factor therefor is presumed as follows. A force functioning at the time of covering the surface of the fine particle with the wax, namely, the intermolecular force between the fine particles and the wax, is dominant only in the range not more than 100 nm. In other words, a specific steric structure that forms a predetermined rugged structure and that has voids therein may be formed due to the intermolecular force and absorption-diffusion into the underlying resin layer.

<Examples of Application Experiment>

The following experiments show that formation of the metaball steric layer is considerably influenced by the difference from the wax in SP value and the heating condition for maintaining the wax in a melted state.

<Experiment 1>

A paraffin wax (melting point: 50 to 52° C.) as a wax melt was fed into a vial bottle with capacity 50 ml, heated to melt under a condition of 70° C., to which the aforementioned hydrophobic dry silica was added to prepare a wax composition (solventless coating composition) containing fine particles dispersed therein.

In this wax composition, the mixing ratio of the wax to the hydrophobic dry silica (wax:silica) was 93:7 (weight ratio).

This wax composition was melted by heating and stirred under a condition of 70° C., and coated, using a bar coater (#6) heated to 70° C., on a film (thickness: about 400 μm) as a underlying resin prepared using LDPE so as to prepare a multilayer structured body.

This multilayer structured body was heated using an oven under three conditions of 60° C.-5 min, 90° C.-5 min, and 120° C.-5 min to melt the wax component included in the coating layer of the wax composition, and later cooled at a room temperature.

Figure 16:
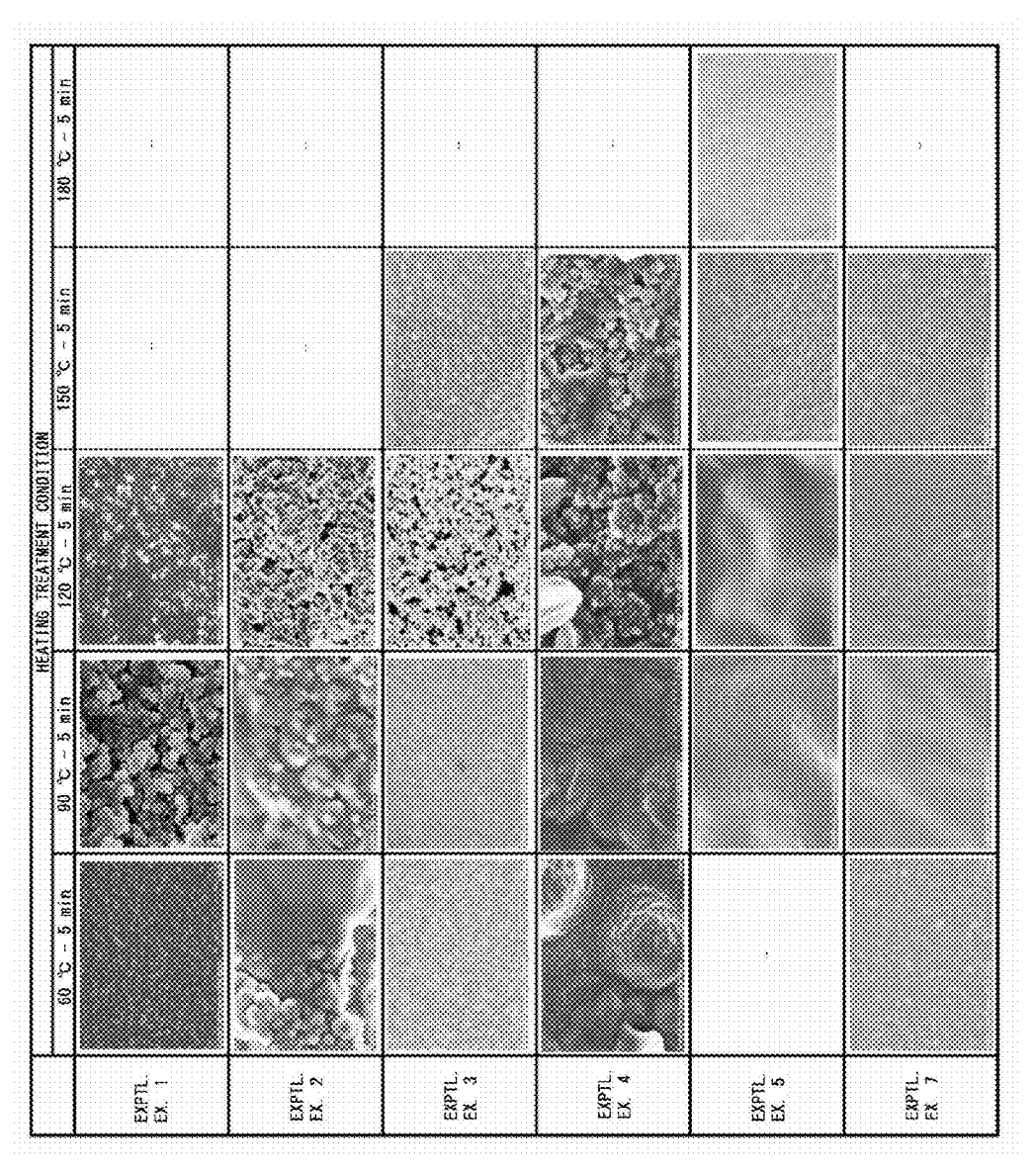

Each sample of the multilayer structured body was subjected to measurement of slip-down angle of distilled water and surface observation as mentioned above before and after heating in an oven. Table 3 shows the obtained values of slip-down angle and presence/absence of rugged structure, together with the type of underlying resin used for preparing the multilayer structured body and the physical properties (melting point, SP value, difference ΔSP in SP value from wax). Further, the form of the rugged surface structure was observed with SEM. The obtained observation images are shown in FIG. 16.

In addition to that, the underlying resin film used for preparing the multilayer structured body was used to evaluate the crystallinity of the underlying layer under the respective heating conditions and to measure the changes in the endothermic peak of the sample. The results are shown in FIG. 17.

Figure 17:
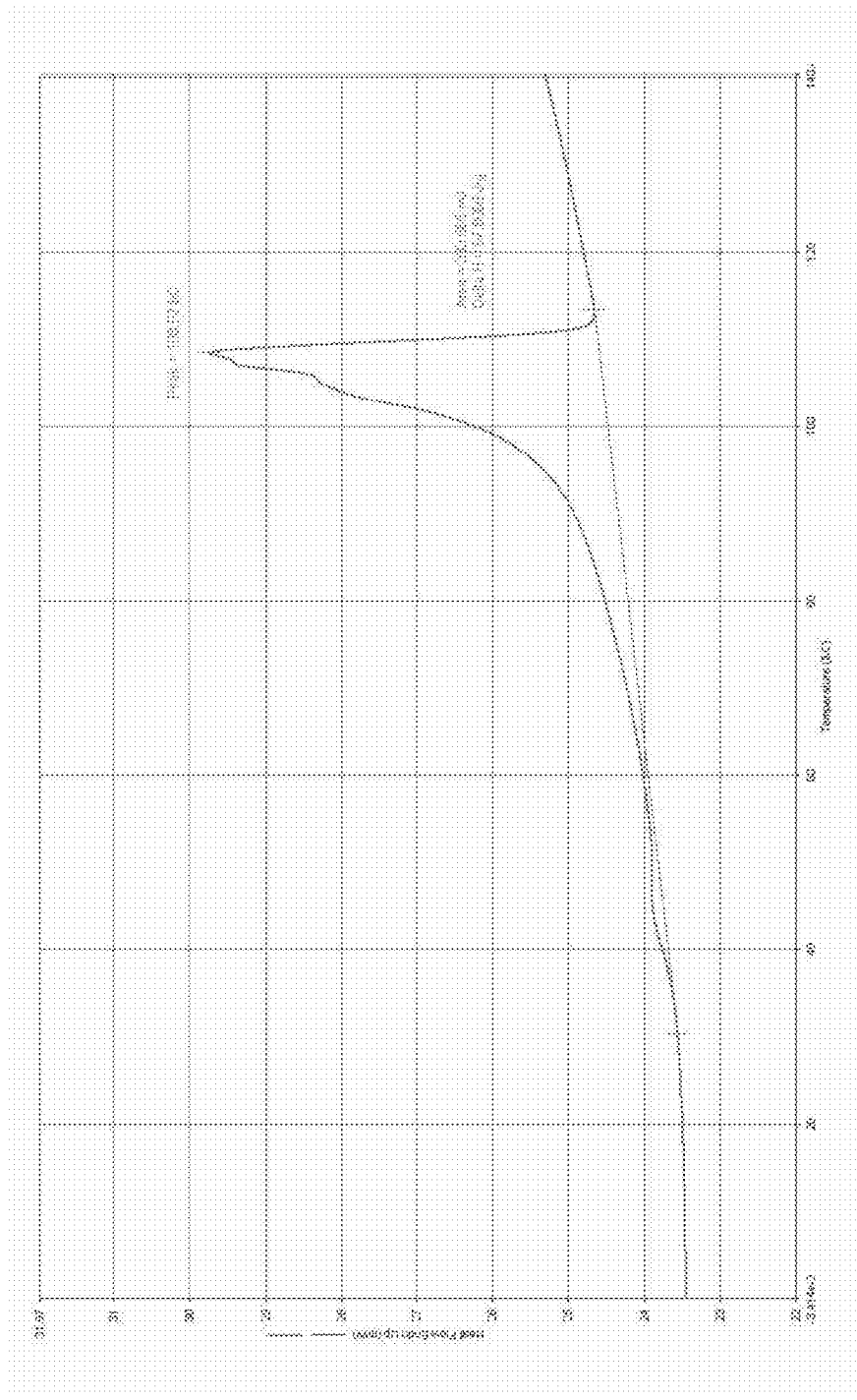
[FIG. 17]: a graph showing a measurement result of an endothermic peak in Experiment 1.

Further, the enthalpy of fusion $\Delta H_T$ of the resin under the respective heating temperature conditions were obtained from the results shown in FIG. 17 to calculate the crystallinity. The results are shown in Table 5.

<Experiment 2>

A multilayer structured body was prepared through operations similar to those in Experiment 1 except that a HDPE film was used for the underlying resin film. Similar measurements were conducted, the results are shown in Table 3. Observation results (SEM photographs) of the rugged surface structure are shown in FIG. 16.

Further, the underlying resin film used for preparing the multilayer structured body was used to evaluate the crystallinity of the underlying layer under the respective heating conditions and to measure the changes in the endothermic peak of the sample. The results are shown in FIG. 18.

Figure 18:
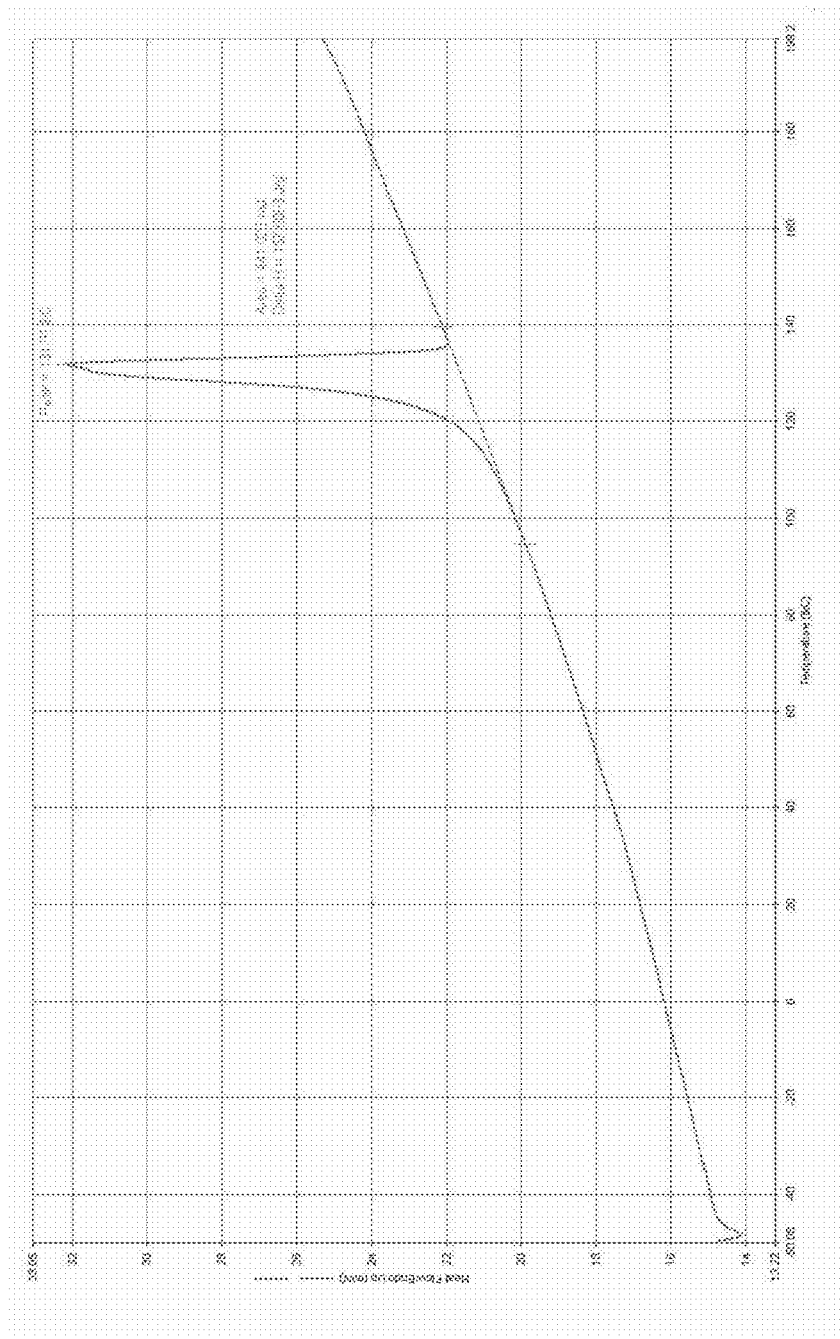
[FIG. 18]: a graph showing a measurement result of an endothermic peak in Experiment 2.

Further, the enthalpy of fusion $\Delta H_T$ of the resin under the respective heating temperature conditions were obtained from the results shown in FIG. 18 to calculate the crystallinity. The results are shown in Table 5.

<Experiment 3>

A multilayer structured body was prepared through operations similar to those in Experiment 1 except that a h-PP film was used for the underlying resin film and that the condition for heating the multilayer structured body further included 150° C.-5 min. Similar measurements were conducted, the results are shown in Table 3. Observation results (SEM photographs) of the rugged surface structure are shown in FIG. 16.

Further, the underlying resin film used for preparing the multilayer structured body was used to evaluate the crystallinity of the underlying layer under the respective heating conditions and to measure the changes in the endothermic peak of the sample. The results are shown in FIG. 18.

Further, the enthalpy of fusion $\Delta H_T$ of the resin under the respective heating temperature conditions were obtained from the results shown in FIG. 18 to calculate the crystallinity. The results are shown in Table 5.

<Experiment 4>

A multilayer structured body was prepared through operations similar to those in Experiment 3 except that a COC film was used for the underlying resin film. Similar measurements were conducted, the results thereof are shown in Table 3. Observation results (SEM photographs) of the rugged surface structure are shown in FIG. 16.

<Experiment 5>

A multilayer structured body was prepared through operations similar to those in Experiment 4 except that EVOH was used for the material of the underlying resin film and that the condition for heating the multilayer structured body excluded 60° C.-5 min and included 180° C.-5 min. Similar measurements were conducted, the results are shown in Table 4. Observation results (SEM photographs) of the rugged surface structure are shown in FIG. 16.

<Experiment 6>

A multilayer structured body was prepared through operations similar to those in Experiment 4 except that a PET film was used for the underlying resin film, and the slip-down angle of distilled water was measured. The results are shown in Table 4.

<Experiment 7>

A multilayer structured body was prepared through operations similar to those in Experiment 4 except that a PET-G film was used for the underlying resin film. Similar measurements were conducted, the results are shown in Table 4. Observation results (SEM photographs) of the rugged surface structure are shown in FIG. 16.

TABLE 5

|  |  | Underlying resin temperature | | | | |
|---|---|---|---|---|---|---|
|  |  | 25° C. | 60° C. | 90° C. | 120° C. | 150° C. |
| Crystallinity $\Delta H_T$ (J/g) | Experiment 1 | 30 | 28 | 21 | 0 | 0 |
|  | Experiment 2 | 55 | 55 | 55 | 52 | 0 |
|  | Experiment 3 | 42 | 42 | 42 | 42 | 35 |

The results of Tables 3 and 4 show that when LDPE was used for the underlying resin, the slip-down angle was 22° under the condition of 60° C.-5 min, namely, favorable liquid repellency was not obtained. Next, when heated under the condition of 90° C.-5 min, the slip-down angle was 1°, namely, remarkably favorable liquid repellency was obtained.

However, when the temperature was raised further and heating was conducted under the condition of 120° C.-5 min, the slip-down angle was increased considerably, and there was a tendency that the liquid repellency was impaired.

TABLE 3

|  | Underlying resin | Melting point (° C.) | ΔSP Difference in SP value | Heating condition | Slip-down angle (degree) | Presence/absence of rugged structure |
|---|---|---|---|---|---|---|
| Expt. 1 | LDPE | 108 | 0.6 | 60° C.-5 min | 22 | Absent |
|  |  |  |  | 90° C.-5 min | 1 | Present |
|  |  |  |  | 120° C.-5 min | 44 | Absent |
|  |  |  |  | 150° C.-5 min | — | — |
|  |  |  |  | 180° C.-5 min | — | — |
| Expt. 2 | HDPE | 132 | 1.4 | 60° C.-5 min | 17 | Absent |
|  |  |  |  | 90° C.-5 min | 17 | Absent |
|  |  |  |  | 120° C.-5 min | 1 | Present |
|  |  |  |  | 150° C.-5 min | 17 | Absent |
|  |  |  |  | 180° C.-5 min | — | — |
| Expt. 3 | h-PP | 164 | 0.9 | 60° C.-5 min | 21 | Absent |
|  |  |  |  | 90° C.-5 min | 20 | Absent |
|  |  |  |  | 120° C.-5 min | 20 | Absent |
|  |  |  |  | 150° C.-5 min | 1 | Present |
|  |  |  |  | 180° C.-5 min | — | — |
| Expt. 4 | COC | — (Amorphous) | 3.5 | 60° C.-5 min | 31 | Absent |
|  |  |  |  | 90° C.-5 min | 22 | Absent |
|  |  |  |  | 120° C.-5 min | 8 | Present (partly) |
|  |  |  |  | 150° C.-5 min | 10 | Present (partly) |
|  |  |  |  | 180° C.-5 min | — | — |

TABLE 4

|  | Underlying resin | Melting point (° C.) | ΔSP Difference in SP value | Heating condition | Slip-down angle (degree) | Presence/absence of rugged structure |
|---|---|---|---|---|---|---|
| Expt. 5 | EVOH | 190 | 1.6 | 60° C.-5 min | — | — |
|  |  |  |  | 90° C.-5 min | 17 | Absent |
|  |  |  |  | 120° C.-5 min | 20 | Absent |
|  |  |  |  | 150° C.-5 min | 18 | Absent |
|  |  |  |  | 180° C.-5 min | 40 | Absent |
| Expt. 6 | PET | 265 | 5.4 | 60° C.-5 min | 13 | Absent |
|  |  |  |  | 90° C.-5 min | 13 | Absent |
|  |  |  |  | 120° C.-5 min | 14 | Absent |
|  |  |  |  | 150° C.-5 min | 14 | Absent |
|  |  |  |  | 180° C.-5 min | — | — |
| Expt. 7 | PET-G | — (Amorphous) | 3.1 | 60° C.-5 min | 21 | Absent |
|  |  |  |  | 90° C.-5 min | 16 | Absent |
|  |  |  |  | 120° C.-5 min | 20 | Absent |
|  |  |  |  | 150° C.-5 min | 21 | Absent |
|  |  |  |  | 180° C.-5 min | — | — |

FIG. 17 (Experiment 1) shows evaluation of crystallinity of the underlying layer under the respective heating conditions. In FIG. 17, the endothermic peak of the LDPE begins to appear at the point of about 30° C., indicating that the crystal portion begins to melt at about 30° C. and the amorphous portion increases gradually with the temperature rise. Later, since the peak becomes the highest at 109° C., it can be estimated that 109° C. is the melting point and the entire crystal portion is melted to form an amorphous state in the temperature range higher than that.

In a comparison of the endothermic peak, heating temperatures in Experiment 1 (60° C., 90° C., and 120° C.) of the LDPE, the crystallinities under the respective temperature conditions ($\Delta H_{60}$, $\Delta H_{90}$, and $\Delta H_{120}$) and the result of surface observation, there was a tendency that the surface state had no change for the case of the test piece heated at 60° C., namely, in the case where the crystallinity of the resin had substantially no change ($\Delta H_{60} \approx \Delta H_0$).

In a case of a test piece heated at 90° C., namely, in a case where the crystal portion of the resin was melted to some extent ($\Delta H_{90} < \Delta H_0$), there was a tendency that the surface structure changed and a metaball-like structure was formed.

Further, in a case of a test piece heated at 120° C., namely, in a case where the entire crystal portion of the resin was melted ($\Delta H_{120}=0$), there was a tendency that a rugged structure was not formed.

FIG. 18 (Experiment 2) shows evaluation of crystallinity of the underlying layer under the respective heating conditions. In FIG. 18, the endothermic peak of the HDPE begins to appear at the point of about 105° C., indicating that the crystal portion begins to melt at about 105° C. and the amorphous portion increases gradually with the temperature rise. Later, since the peak becomes the highest at 131° C., it can be estimated that 131° C. is the melting point and the entire crystal portion is melted to form an amorphous state in the temperature range higher than that.

In a comparison of the endothermic peak, heating temperatures in Experiment 2 (60° C., 90° C., 120° C., and 150° C.) and the crystallinities under the respective temperature conditions ($\Delta H_{60}$, $\Delta H_{90}$, $\Delta H_{120}$, and $\Delta H_{150}$), there was a tendency that the surface state had no change for the case of the test piece heated at 60° C., namely, in the case where the crystallinity of the resin had no change ($\Delta H_{90} \approx \Delta H_0$).

Similarly, for the test piece heated at 90° C., the crystallinity of resin had no change ($\Delta H_{90} \approx \Delta H_0$), there was a tendency that the surface structure had no change and a rugged structure was not formed.

In a case of a test piece heated at 120° C., namely, in a case where the crystal portion of the resin was melted to some extent ($\Delta H_{120} < \Delta H_0$), there was a tendency that the surface structure changed and a metaball-like structure was formed.

However, in a case of a test piece heated at 150° C., namely, in a case where the entire crystal portion of the resin was melted ($\Delta H_{150}=0$), there was a tendency that a rugged structure was not formed.

Figure 19:
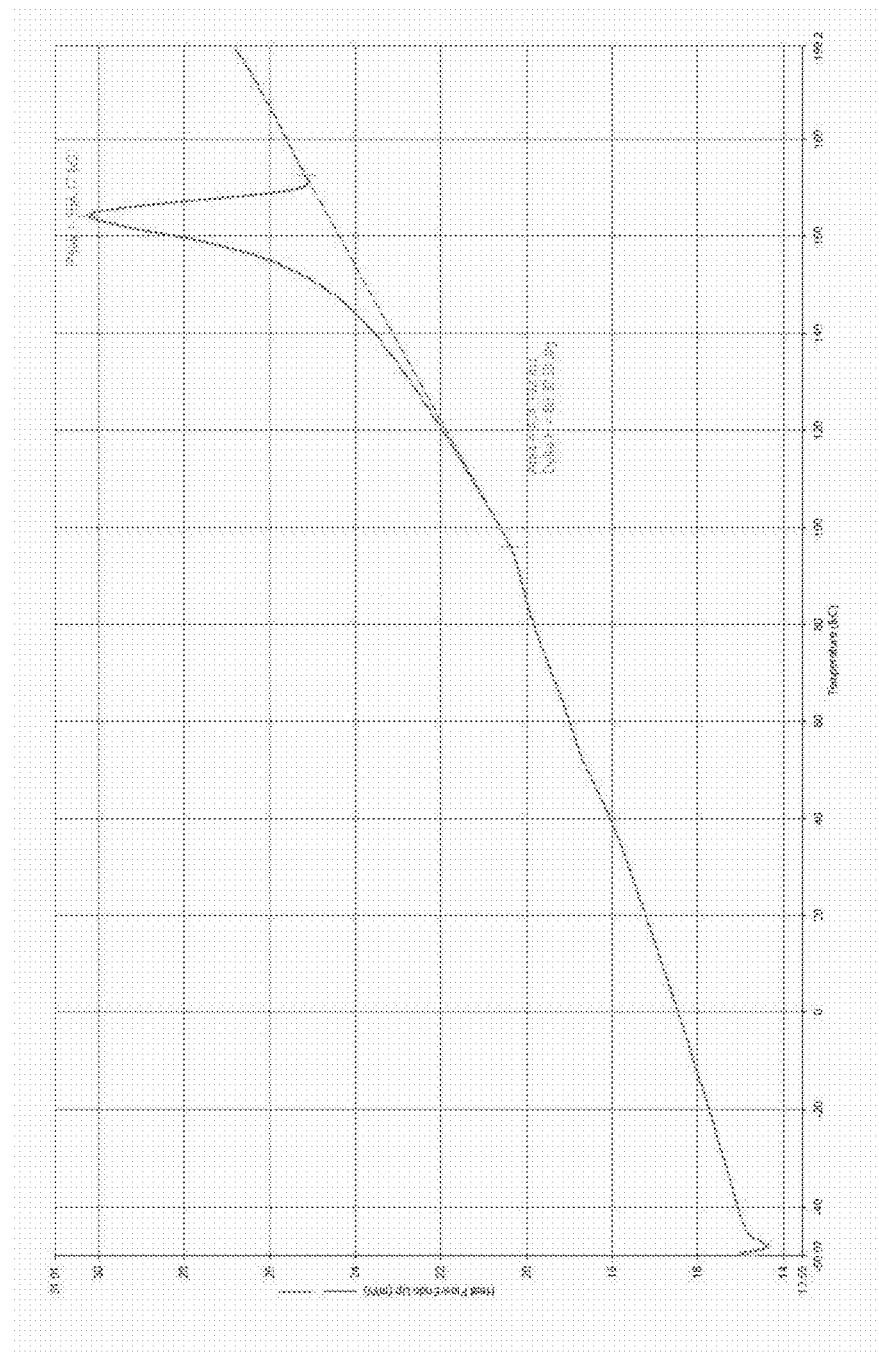
[FIG. 19]: a graph showing a measurement result of an endothermic peak in Experiment 3.

FIG. 19 (Experiment 3) shows evaluation of crystallinity of the underlying layer under the respective heating conditions. In FIG. 19, the endothermic peak of the h-PP begins to appear at the point of about 110° C., indicating that the crystal portion begins to melt at about 110° C. and the amorphous portion increases gradually with the temperature rise. Later, since the peak becomes the highest at 164° C., it can be estimated that 164° C. is the melting point and the entire crystal portion is melted to form an amorphous state in the temperature range higher than that.

In a comparison of the endothermic peak, heating temperatures in Experiment 3 (60° C., 90° C., 120° C., and 150° C.) and the crystallinities under the respective temperature conditions ($\Delta H_{60}$, $\Delta H_{90}$, $\Delta H_{120}$, and $\Delta H_{150}$), there was a tendency that the surface state had no change for the case of the test piece heated at 60° C., namely, in the case where the crystallinity of the resin had no change ($\Delta H_{60} \approx \Delta H_0$).

Similarly in a case of a test piece heated at 90° C., the crystallinity of the resin had no change ($\Delta H_{90} \approx \Delta H_0$), and there was a tendency that the surface structure had no change.

Further in a case of a test piece heated at 120° C., the crystallinity of the resin had no change ($\Delta H_{120} \approx \Delta H_0$), there was a tendency that the surface structure had no change.

In contrast, in a case of a test piece heated at 150° C., namely, in a case where the crystal portion of the resin was melted to some extent ($\Delta H_{150} < \Delta H_0$), there was a tendency that the surface structure changed and a metaball-like structure was formed.

These results indicate that the conditions for obtaining favorable liquid repellency are:
(A) the SP value of paraffin wax as a dispersion medium and the SP value of the underlying resin are approximate to each other, namely, δ1-δ2 is 1.5 or less;
(B) the crystal of the underlying resin is melted to some extent at the time of heating a laminated structured body after coating, and the crystal portion remains ($0<\Delta H_T<\Delta H_0$), namely, for providing the aforementioned condition, the melting point of the resin is set to be X° C., and heating was conducted for 5 to 10 minutes at a temperature Y satisfying $$X-5 \geq Y \geq X-50; \text{ and}$$

(C) the underlying resin is a crystalline resin. When all of these conditions were satisfied, there was a tendency that a metaball-like rugged structure was formed.

<Consideration>

The metaball-like rugged structure obtained under the conditions may have a structure where rugged structures are laminated sterically, and the structure has a lot of fine voids. It is considered, therefore, at the time of dropping a liquid of contents, numbers of air pockets may be formed on the interface between the liquid drops and the structure, thereby exhibiting particularly high liquid repellency.

Such a structure may be formed partly because of a phenomenon that the paraffin wax used as a dispersion medium is dispersed into the underlying resin and absorbed therein at the time of heating the multilayer structured body. When the compatibility between the paraffin wax and the underlying resin is low, that is, there is a large difference between δ1 and δ2, the dispersion into the underlying resin may not occur inherently, or the dispersion rate may be extremely low. In that case, the wax component present on the outermost surface is not decreased and the smooth state of the surface may be kept, thereby hindering formation of the metaball-shaped structure.

At the time of heating the laminated structured body after coating, when the heating is conducted under a condition that the crystal portion of the underlying resin is not melted at all ($\Delta H_0 \approx \Delta H_T$), the crystal portion of the underlying resin is considered to control or reduce diffusion of the paraffin wax and to prevent absorption of the paraffin wax into the underlying resin layer. As a result, the wax component on the outermost surface is not decreased, the smooth state of the surface is kept, which probably hinders formation of the metaball-shaped structure.

When the heating is conducted under the heating condition (ΔH=0) that the underlying resin is completely melted, namely, when the heating is conducted at or above the melting point of the underlying resin, the crystal portion may be melted completely and dispersion of the paraffin wax may be performed in a preferable manner. At the same time, however, the underlying resin itself is melted and liquefied, and thus, the structure due to the wax and the hydrophobic fine particles themselves may be retracted into the underlying resin layer to hinder formation of the metaball-shaped rugged structure.

In the case where the underlying resins are amorphous resins (COC and PET-G), it is presumed that a phenomenon similar to the condition of a complete melt of the crystal portion occurs, whereby the rugged structure is not formed.

Therefore, presumably in the present invention, a combination of an underlying resin and a wax having favorable compatibility with each other are selected, the surface coating is conducted with the wax containing fine particles dispersed therein, and the multilayer structured body is heated under the condition that the crystal portion of the underlying resin is sufficiently melted while the crystal portion remains, so that the wax component is absorbed into the underlying resin to accelerate formation of the metaball-shaped structure on the surface.

EXPLANATIONS OF LETTERS OR NUMERALS

1: underlying resin layer absorbing paraffin wax (underlying layer)
3: paraffin wax
5: metaball steric layer
7: fine particles
10: structured body

The invention claimed is:

1. A structured body including: a formed body having a surface formed of a resin layer and fine particles distributed on the resin layer on the surface of the formed body,
   wherein wax is distributed on the surface of the resin layer together with the fine particles, and the wax is partly absorbed into the resin layer, and
   wherein a metaball steric layer of the wax spreading like continuous metaballs is formed on the resin layer, and the fine particles are distributed inside the metaball steric layer.

2. The structured body according to claim 1, wherein the fine particles are hydrophobic fine particles.

3. The structured body according to claim 1, wherein the metaball steric layer has a structure of linked balls having a diameter in a range of 20 to 200 nm in an observation with a scanning electron microscope.

4. The structured body according to claim 1, wherein the fine particles have an average primary particle diameter in a range of 4 nm to 1 μm.

5. The structured body according to claim 1, wherein the wax has a melting point in a range of 40° C. to 110° C.

6. The structured body according to claim 1, wherein the resin layer is formed of a resin having an SP value different by not more than 1.5 $(MPa)^{1/2}$ from an SP value of the wax.

7. The structured body according to claim 6, wherein the resin forming the resin layer is an acyclic olefinic resin and the wax is at least one selected from the group consisting of paraffin wax, microcrystalline wax, and polyethylene wax.

8. The structured body according to claim 1, wherein the formed body has a form of a container, and the fine particles and the wax are distributed on the inner surface of the container to be in contact with a content contained in the container.

9. The structured body according to claim 8, wherein the container is a bottle made of an olefinic resin.

10. The structured body according to claim 1, wherein the formed body has a form of a lid provided at a mouth of a container by heat-sealing, and the fine particles and the wax are distributed on the surface to be in contact with a content contained in the container.

11. A method for producing the structured body of claim 1, the structured body having a hydrophobic surface, including:
    a step of preparing a solventless coating composition containing fine particles and melted wax, and a formed body having a surface formed of a layer of a wax-absorbent resin;
    a coating step of coating the solventless coating composition on the surface of the formed body;
    a wax-absorbing step of heating the surface of the formed body at a temperature not lower than the melting point of the wax to maintain the wax in a melted state so as to allow the wax to be absorbed into the wax-absorbent resin layer on the surface; and
    a cooling step of cooling the formed body surface after the wax-absorbing step so as to solidify the melted wax.

12. The producing method according to claim 11, wherein the wax-absorbent resin has an SP value different by not more than 1.5 $(MPa)^{1/2}$ from an SP value of the wax.

13. The producing method according to claim 11, wherein when the melting point of the wax-absorbent resin is X° C., heating for maintaining the wax in the melted state during the wax-absorbing step is conducted for a time period of 5 seconds to 10 minutes at a temperature Y that satisfies a conditional formula:

$$X-5 \geq Y \geq X-50.$$

14. A method for producing the structured body of claim 1, the structured body having a hydrophobic surface, including production of a formed body having a surface formed of a layer of a wax-absorbent resin by co-extrusion of the wax-absorbent resin, wherein a solventless composition containing fine particles and a melted wax is co-extruded at a position to be a surface side and adjacent to the layer of the wax-absorbent resin.

* * * * *